United States Patent
Sano et al.

(10) Patent No.: US 7,760,997 B2
(45) Date of Patent: Jul. 20, 2010

(54) SHAKE DETECTION DEVICE, SHAKE DETECTION METHOD, AND SHAKE DETECTION PROGRAM

(75) Inventors: Megumi Sano, Tachikawa (JP); Kazuo Nomura, Shiojiri (JP)

(73) Assignee: Seiko Epson Corporation (JP)

( * ) Notice: Subject to any disclaimer, the term of this patent is extended or adjusted under 35 U.S.C. 154(b) by 506 days.

(21) Appl. No.: 11/734,301

(22) Filed: Apr. 12, 2007

(65) Prior Publication Data
US 2007/0242937 A1    Oct. 18, 2007

(30) Foreign Application Priority Data
Apr. 14, 2006  (JP)  ............... 2006-111871
Apr. 21, 2006  (JP)  ............... 2006-117511
May 9, 2006    (JP)  ............... 2006-129879

(51) Int. Cl.
G03B 17/00    (2006.01)
(52) U.S. Cl. ..................... 396/55; 348/208.5
(58) Field of Classification Search ............. 396/53–55, 396/550; 348/208.99, 208.1, 208.2, 208.4, 348/208.5, 208.13
See application file for complete search history.

(56) References Cited

U.S. PATENT DOCUMENTS 5,282,044 A * 1/1994 Misawa et al. ........... 348/208.5
5,619,030 A * 4/1997 Shiomi ..................... 396/55
6,501,503 B2 * 12/2002 Kudo ..................... 348/208.5
6,532,340 B1 * 3/2003 Sato ....................... 396/52

FOREIGN PATENT DOCUMENTS

| JP | 05-061091 | 3/1993 |
| JP | 05-142613 | 6/1993 |
| JP | 09-189932 | 7/1997 |

* cited by examiner

Primary Examiner—Christopher E Mahoney
Assistant Examiner—Autumn Parker
(74) Attorney, Agent, or Firm—Harness, Dickey & Pierce, P.L.C.

(57) ABSTRACT

A shake detection device detecting a camera shake amount generated when photographing a subject includes a detection sensor detecting a rotation speed around a predetermined axis of the camera, a first image shift amount calculation unit driving the detection sensor to detect the rotation speed and, for an image of the subject photographed by the camera, calculating a first image shift amount as an image shift amount in a first direction based on the rotation speed, a second image shift amount calculation unit performing a predetermined image analysis on the image of the subject photographed by the camera and, for the image of the subject photographed by the camera, calculating a second image shift amount as an image shift amount in a second direction based on the analysis result, and a shake amount estimation unit estimating the camera shake amount using the first and second image shift amounts.

6 Claims, 20 Drawing Sheets

NO SHIFT / PHOTOGRAPHED IMAGE

VERTICAL SHIFT

HORIZONTAL SHIFT

ROTATIONAL SHIFT

VERTICAL AND HORIZONTAL SHIFT

VERTICAL, HORIZONTAL, AND ROTATIONAL SHIFT

SHAKE DETECTION DEVICE, SHAKE DETECTION METHOD, AND SHAKE DETECTION PROGRAM

RELATED APPLICATIONS

This application claims priority to Japanese Patent Application Nos. 2006-111871 filed Apr. 14, 2006, 2006-117511 filed Apr. 21, 2006 and 2006-129879 filed May 9, 2006 which are hereby expressly incorporated by reference herein in their entirety.

BACKGROUND

1. Technical Field

The present invention relates to a shake detection device, a shake detection method, and a shake detection program that detect a shake amount of a camera to be generated when photographing a subject.

2. Related Art

One known technique for detecting the motion of an electronic apparatus and correcting or controlling the functions of the electronic apparatus according to the detected motion involves mounting a detection device for detecting motion, such as a gyroscope or the like, on the electronic apparatus. For example, when the electronic apparatus is an imaging apparatus, such as a digital camera, a shake amount to be generated upon photographing as a motion of the camera is detected using a detection sensor, such as a gyroscope, and a photographing condition upon photographing is corrected based on the detected shake amount, thereby suppressing a vertical or horizontal image shift amount from being generated in a photographed image (see JP-A-5-142613 or JP-A-9-189932).

Further, in detecting the shake amount, at least two detection sensors are usually used to detect the shake amount in order to calculate an accurate shake amount. JP-A-5-142613 discloses a technology that detects a shake amount by disposing two detection sensors at a grip position of a camera. JP-A-9-189932 discloses a technology that detects a shake amount by disposing two detection sensors in the vicinity of a pentaprism.

Recently, an imaging apparatus, such as a camera-equipped cellular phone or the like, has been reduced in size, and a battery to be mounted on the imaging apparatus has also been reduced in size accordingly. For this reason, in order to prevent the lifespan of the battery from being shortened, there is a need for a power saving measure that reduces the current consumption of the imaging apparatus.

As the detection sensor for detecting the shake amount, a gyro sensor that uses a vibrator, such as a piezoelectric vibrator, is usually used. A predetermined angular speed around an axis is detected by detecting a change in vibration state of the vibrator. For this reason, in order to detect the shake amount, the piezoelectric vibrator needs to be driven and to vibrate at all times, and thus a driving current needs to flow in the detection sensor at all times. Accordingly, the detection sensor consumes the electric current, which shortens the lifespan of the battery.

However, in JP-A-5-142613 and JP-A-9-189932, a technology about current consumption upon shake detection is not disclosed. Although the shake amount is detected by the detection sensor and an image shift of a subject can be suppressed from occurring in a photographed image, there is a problem in that the lifespan of the battery is shortened.

SUMMARY

An advantage of some aspects of the invention is that it provides a shake detection device, a shake detection method, and a shake detection program that uses a detection sensor so as to suppress an image shift amount of a subject from being generated in a photographed image and to suppress the shortening of the lifespan of a battery.

According to a first aspect of the invention, there is provided a shake detection device that detects a shake amount of a camera to be generated when photographing a subject. The shake detection device includes a detection sensor that detects a rotation speed around a predetermined axis of the camera, a first image shift amount calculation unit that drives the detection sensor to detect the rotation speed and, for an image of the subject photographed by the camera, calculates a first image shift amount as an image shift amount in a first direction based on the rotation speed, a second image shift amount calculation unit that performs a predetermined image analysis on the image of the subject photographed by the camera and, for the image of the subject photographed by the camera, calculates a second image shift amount as an image shift amount in a second direction based on the analysis result, and a shake amount estimation unit that estimates the shake amount of the camera using the first image shift amount and the second image shift amount.

With this configuration, a vertical image shift amount of a photographed image is calculated using the detection sensor, and a horizontal image shift amount thereof is calculated by analyzing the photographed image. Then, the shake amount of the camera is estimated using the calculated vertical and horizontal image shift amounts. Accordingly, the shake amount of the camera can be estimated even though a single detection sensor is provided. Therefore, the image shift amount of the subject can be suppressed from being generated in the photographed image and the lifespan of a battery can be extended.

The shake detection device according to the first aspect of the invention may further include an image shift amount recording unit that records the second image shift amount calculated by the second image shift amount calculation unit each time the subject is photographed. The shake amount estimation unit estimates the shake amount of the camera using the image shift amount, which is calculated through a predetermined method from a plurality of second image shift amounts recorded by the image shift amount recording unit, as the second image shift amount.

With this configuration, the horizontal image shift amount calculated from the analysis result of the photographed image is recorded each time photographing is performed, and the shake amount is estimated using the plurality of recorded horizontal image shift amounts. Accordingly, since the plurality of horizontal image shift amounts are used, the shake amount of the camera is estimated with high precision.

In the shake detection device according to the first aspect of the invention, the first direction and the second direction in the photographed image may be set to cross each other at right angles.

With this configuration, the image shift amounts are calculated with respect to two axial directions crossing each other. Accordingly, the motion of the camera due to the shake can be obtained as motion components in separate directions not having a common directional component. Therefore, the shake amount of the camera is estimated with high precision.

The shake detection device according to the first aspect of the invention may include a photographing condition correction unit that corrects a photographing condition of the camera according to the shake amount estimated by the shake amount estimation unit.

With this configuration, the photographing condition of the camera, such as shutter speed, aperture, or sensitivity, can be corrected according to the estimated shake amount. Therefore, it is possible to photograph an image in which the image shift amount of the subject is suppressed.

The shake detection device according to the first aspect of the invention may further include a notification unit that notifies (indicates) the corrected photographing condition.

With this configuration, a photographer sets the photographing condition of the camera, such as shutter speed or aperture, to the notified photographing condition upon subsequent photographing. Then, it is possible to suppress the image shift amount of the subject generated in the photographed image. In addition, upon subsequent photographing, the shake amount does not need to be detected using the detection sensor. Therefore, the detection sensor does not need to be driven, which makes it possible to suppress the reduction of the lifespan of the battery.

According to a second aspect of the invention, there is provided a shake detection device that detects a shake amount of a camera to be generated when photographing a subject. The shake detection device includes a first detection sensor and a second detection sensor that detect a first rotation speed and a second rotation speed around a first axis and a second axis as two predetermined axes of the camera, respectively, an image shift amount calculation unit that drives the first detection sensor to detect the first rotation speed and, for an image of the subject to be photographed by the camera, calculates a first image shift amount as an image shift amount in a first direction based on the first rotation speed, or drives the second detection sensor to detect the second rotation speed and, for the image of the subject to be photographed by the camera, calculates a second image shift amount as an image shift amount in a second direction based on the second rotation speed, an image shift amount selection unit that compares the first image shift amount and the second image shift amount, sets a larger one of the first image shift amount and the second image shift amount to a third image shift amount, and selects the other one as a fourth image shift amount, and a shake amount estimation unit that estimates the shake amount of the camera using the third image shift amount.

With this configuration, the vertical image shift amount of the photographed image is calculated using the first detection sensor, and the horizontal image shift amount thereof is calculated using the second detection sensor. Then, the calculated vertical and horizontal image shift amounts are compared with each other. When the vertical image shift amount is larger, the shake amount of the camera is estimated using the vertical image shift amount. That is, of the two detection sensors, a detection sensor that detects a larger image shift amount is driven so as to calculate the image shift amount to be generated in the photographed image. Therefore, the shake amount can be estimated using a single detection sensor. As a result, it is possible to suppress the image shift amount from being generated in the photographed image using a single detection sensor.

The shake detection device according to the second aspect of the invention may further include a photographing mode judgment unit that judges whether or not the camera is in photographing mode where the subject can be photographed by the camera, and a number-of-photographing-times recording unit that records the number of photographing times of the camera after the photographing mode judgment unit judges that it is in the photographing mode. When the number of photographing times is equal to or more than two, the image shift amount calculation unit may drive only one detection sensor of the first and second detection sensors, which detects a rotation speed corresponding to the third image shift amount selected when the number of photographing times is one.

With this configuration, the two detection sensors are driven when photographing is first performed after the camera becomes in the photographing mode, and the vertical and horizontal image shift amounts calculated by the detection sensors are compared with each other, thereby selecting a larger one of the vertical and horizontal image shift amounts. Then, when the vertical shift amount is selected, only the detection sensor that detects the vertical image shift amount is driven and then the image shift amount of the subject to be generated in the photographed image is calculated when photographing is performed a second time or later. Accordingly, when photographing is performed a second time or later, only one detection sensor is driven so as to estimate the shake amount of the camera. Therefore, the image shift amount to be generated in the photographed image can be suppressed, and the lifespan of the battery can be extended.

In the shake detection device according to the second aspect of the invention, when the number of photographing times is equal to or more than two, the shake amount of the camera may be estimated using the third image shift amount and the fourth image shift amount selected when the number of photographing times is one.

With this configuration, when the vertical image shift amount is larger when photographing is first performed, the shake amount of the camera when photographing is performed a second time or later is estimated using the vertical image shift amount calculated by the detection sensor and the horizontal image shift amount calculated by the detection sensor when photographing is first performed. Accordingly, when photographing is performed a second time or later, even though only one detection sensor is driven, the shake amount of the camera can be estimated using both the vertical image shift amount and the horizontal image shift amount calculated by the detection sensor when photographing is first performed. Therefore, the image shift amount to be generated in the photographed image can be suppressed more accurately and the lifespan of the battery can be extended.

In the shake detection device according to the second aspect of the invention, the first direction and the second direction in the photographed image may be set to cross each other at right angles.

With this configuration, since image shift amounts are calculated with respect to two axial directions crossing each other, the motion of the camera due to the shake can be obtained as motion components in separate directions not having a common directional component. Therefore, the shake amount of the camera can be estimated with high precision.

The shake detection device according to the second aspect of the invention may further include a photographing condition correction unit that corrects a photographing condition of the camera according to the shake amount estimated by the shake amount estimation unit.

With this configuration, a photographing condition of the camera, such as shutter speed, aperture, or sensitivity, can be corrected according to the estimated shake amount. Therefore, it is possible to photograph an image in which the image shift amount of the subject is suppressed.

The shake detection device according to the second aspect of the invention may further include a notification unit that notifies (indicates) the corrected photographing condition.

With this configuration, a photographer sets the photographing condition of the camera, such as a shutter speed or an aperture, to the notified photographing condition upon subsequent photographing. Then, it is possible to suppress the image shift amount of the subject generated in the photographed image. In addition, upon subsequent photographing, the shake amount does not need to be detected using the detection sensor. Therefore, the detection sensor does not need to be driven, which makes it possible to extend the lifespan of the battery.

The invention can also be implemented as a shake detection method. That is, according to a third aspect of the invention, there is provided a shake detection method that detects a shake amount of a camera to be generated when photographing a subject. The shake detection method includes driving a detection sensor for detecting a rotation speed around a predetermined axis of the camera to detect the rotation speed and, for an image of the subject to be photographed by the camera, calculating a first image shift amount as an image shift amount in a first direction based on the rotation speed, performing a predetermined image analysis on the image of the subject photographed by the camera and, for the image of the subject photographed by the camera, calculating a second image shift amount as an image shift amount in a second direction based on the analysis result, and estimating the shake amount of the camera using the first image shift amount and the second image shift amount.

According to a fourth aspect of the invention, there is provided a shake detection method that detects a shake amount of a camera to be generated when photographing a subject. The shake detection method includes detecting a first rotation speed and a second rotation speed around a first axis and a second axis as two predetermined axes of the camera using a first detection sensor and a second detection sensor, respectively, driving the first detection sensor to detect the first rotation speed and, for an image of the subject to be photographed by the camera, calculating a first image shift amount as an image shift amount in a first direction based on the first rotation speed, or driving the second detection sensor to detect the second rotation speed and, for the image of the subject to be photographed by the camera, calculating a second image shift amount as an image shift amount in a second direction based on the second rotation speed, comparing the first image shift amount and the second image shift amount, setting a larger one of the first image shift amount and the second image shift amount to a third image shift amount, and selecting the other one as a fourth image shift amount, judging whether or not the camera is in a photographing mode where the subject can be photographed by the camera, and recording the number of photographing times of the camera after it is judged in the judging of the photographing mode that it is in the photographing mode. In the calculating of the image shift amount, when the number of photographing times is equal to or more than two, only one of the first and second detection sensors, which detects a rotation speed corresponding to the third image shift amount selected when the number of photographing times is one, is driven.

The invention can also be implemented by a shake detection program. That is, according to a fifth aspect of the invention, there is provided a shake detection program that detects a shake amount of a camera to be generated when photographing a subject. The shake detection program causes a computer to execute driving a detection sensor for detecting a rotation speed around a predetermined axis of the camera to detect the rotation speed and, for an image of the subject to be photographed by the camera, calculating a first image shift amount as an image shift amount in a first direction based on the rotation speed, performing a predetermined image analysis on the image of the subject photographed by the camera and, for the image of the subject photographed by the camera, calculating a second image shift amount as an image shift amount in a second direction based on the analysis result, and estimating the shake amount of the camera using the first image shift amount and the second image shift amount.

According to a sixth aspect of the invention, there is provided a shake detection program that detects a shake amount of a camera to be generated when photographing a subject. The shake detection program causes a computer to execute detecting a first rotation speed and a second rotation speed around a first axis and a second axis as two predetermined axes of the camera using a first detection sensor and a second detection sensor, respectively, driving the first detection sensor to detect the first rotation speed and, for an image of the subject to be photographed by the camera, calculating a first image shift amount as an image shift amount in a first direction based on the first rotation speed, or driving the second detection sensor to detect the second rotation speed and, for the image of the subject to be photographed by the camera, calculating a second image shift amount as an image shift amount in a second direction based on the second rotation speed, comparing the first image shift amount and the second image shift amount, setting a larger one of the first image shift amount and the second image shift amount to a third image shift amount, and selecting the other one as a fourth image shift amount, judging whether or not the camera is in a photographing mode where the subject can be photographed by the camera, and recording the number of photographing times of the camera after it is judged in the judging of the photographing mode that it is in the photographing mode. In the calculating of the image shift amount, when the number of photographing times is equal to or more than two, only one of the first and second detection sensors, which detects a rotation speed corresponding to the third image shift amount selected when the number of photographing times is one, is driven.

BRIEF DESCRIPTION OF THE DRAWINGS

The invention will be described with reference to the accompanying drawings wherein like numbers reference like elements.

DESCRIPTION OF EXEMPLARY EMBODIMENTS

Hereinafter, preferred embodiments of the invention will be described. In a first embodiment, a case where a single detection sensor is provided to estimate a shake amount will be described. In a second embodiment, a case where two detection sensors are provided to estimate a shake amount will be described.

Figure 1A:
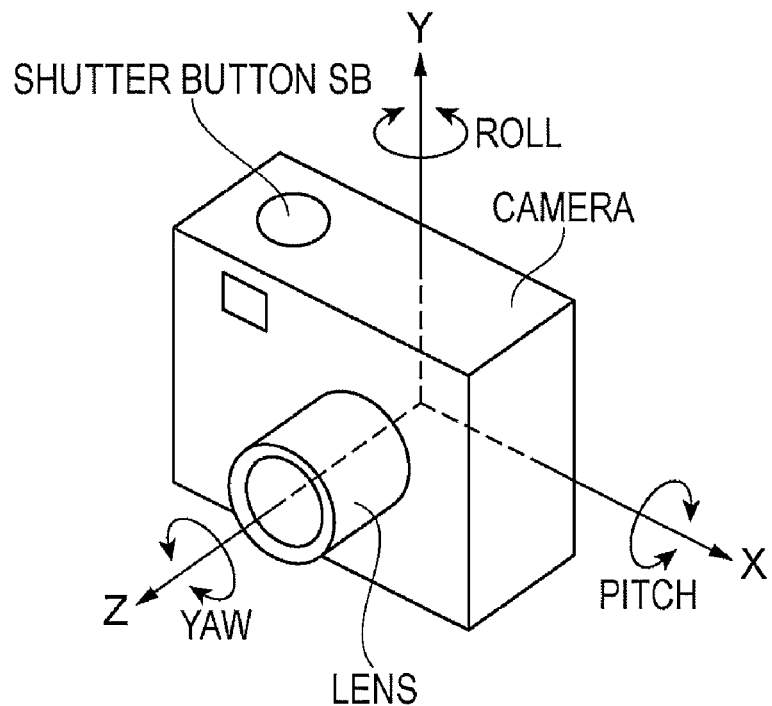
FIG. 1A is a diagram illustrating a camera.
Figure 1B:
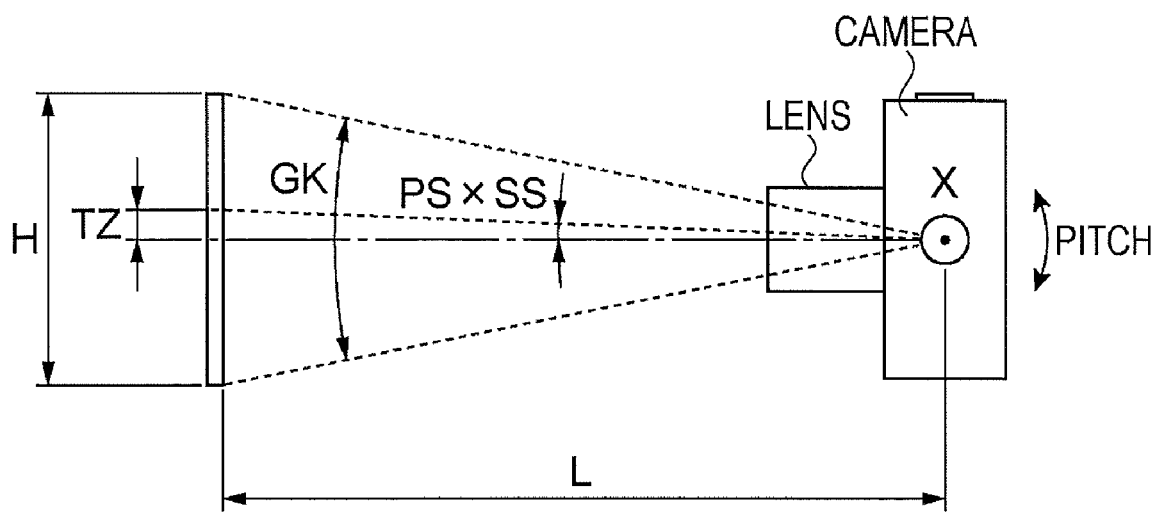
FIG. 1B is a diagram illustrating an image shift amount of a subject in a photographed image.

Prior to the description of the embodiments, the outline of a shake detection device according to the invention will be described with reference to FIGS. 1A to 2F. FIGS. 1A and 1B are diagrams illustrating a shake amount upon photographing in a digital camera (hereinafter, referred to as 'camera') as an example of an electronic apparatus in which the shake detection device of the invention is to be incorporated. FIGS. 2A to 2F are diagrams illustrating an image shift amount of a subject that is generated in a photographed image.

As shown in FIG. 1A, when a subject is photographed by pressing a shutter button SB to release a shutter, the camera shakes due to the motion of the body of the photographer. As shown in FIG. 1A, when the horizontal axis of the camera is set to an X axis, the vertical axis of the camera is set to a Y axis, and the central axis of a lens is set to a Z axis, the shake occurs as rotations around the individual axes. The rotation around the X axis is referred to as 'pitch', the rotation around the Y axis is referred to as 'roll', and the rotation around the Z axis is referred to as 'yaw'.

For example, when the subject is photographed with a camera in a state shown in FIG. 1A, and if a pitch occurs in the camera, a vertical shift occurs in an image of the subject. The image shift amount is calculated from the relationship among the rotation speed of the pitch, a shutter speed, and a field angle. The image shift amount will be described with reference to FIG. 1B.

FIG. 1B shows a state when the camera is viewed from the X-axis direction. As shown in FIG. 1B, when the field angle of the camera when photographing is set to GK (degree), the range of an image to be photographed is in a range according to the field angle GK. Further, FIG. 1B shows that, when the subject spaced at a distance L from the camera is photographed, the vertical screen size of the photographed image becomes H.

In this state, when the pitch around the X-axis occurs at a rotation speed PS (degree/second) when photographing, the camera takes an image of the subject using an imaging element (not shown), such as a CCD, provided in the camera while a shutter is opened. Therefore, the photographed image of the subject is shifted in the vertical direction by an amount corresponding to a pitch rotation amount for a time of a shutter speed SS (second).

When the vertical image shift amount is represented as TZ, the vertical image shift amount is calculated by TZ=H×(PS× SS/GK). Since the photographed image is taken by the imaging element, such as a CCD, an image shift amount is calculated as the number of pixels when the number of vertical pixels of the imaging element is represented by H. Therefore, the calculation of the image shift amount described in the following embodiments is performed by the calculation of the number of pixels.

Similarly to the X axis, when a roll rotation occurs around the Y axis, the image of the subject in the photographed image is shifted in the horizontal direction, such that an image shift amount YZ is generated. Further, when a yaw rotation occurs around the Z axis, the image of the subject in the photographed image is shifted in the rotational direction, such that an image shift amount KZ is generated.

Figure 2A:
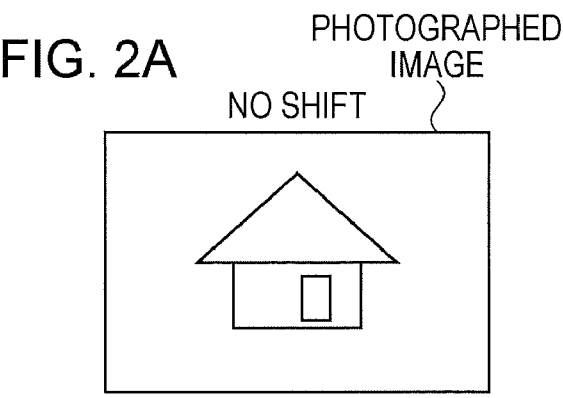
FIGS. 2A to 2F are diagrams illustrating an image shift of a subject in a photographed image.
Figure 2B:
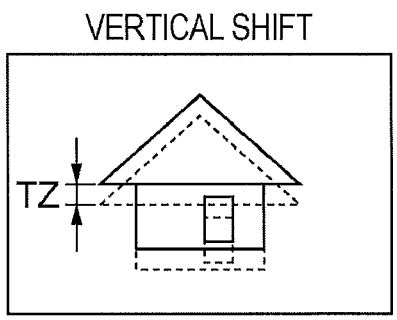
Figure 2C:
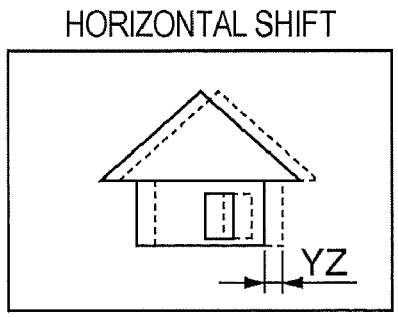
Figure 2D:
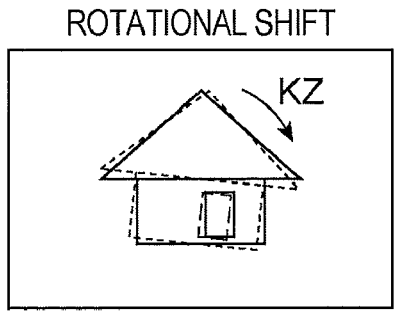

FIGS. 2A to 2F show the image shift amounts TZ, YZ, and KZ. FIG. 2A shows a state where an image shift does not occur in the subject of the photographed image. Meanwhile, FIG. 2B shows a state where the image of the subject is shifted by the vertical image shift amount TZ, FIG. 2C shows a state where the image of the subject is shifted by the horizontal image shift amount YZ, and FIG. 2D shows a state where the image of the subject is shifted by the rotational image shift amount KZ.

Figure 2E:
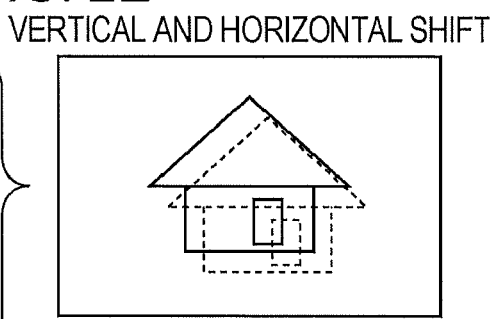
Figure 2F:
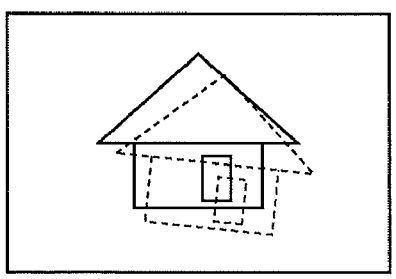

Further, the image of the subject may be shifted in a state where the image shift amounts are added. For example, when a pitch and a roll occur, the image is shifted in a direction where the vertical shift amount and the horizontal shift amount are added, as shown in FIG. 2E. When the pitch, roll, and yaw all occur, the image is shifted in a direction where the vertical shift amount, the horizontal shift amount, and the rotational shift amount are added, as shown in FIG. 2F.

However, there are many cases where a person holds a camera with both left and right hands and puts the camera on a portion of his/her face to stabilize the camera when photographing. In such a state, since the camera rarely rotates, it is assumed that the frequency of the rotation of the camera around the Z axis in FIG. 1A is low. Meanwhile, since the camera easily moves in the up to down and down to up directions or the left to right and right to left directions by the motion of the body of the photographer, it is estimated that the frequency of the rotations of the camera around the X and Y axes is relatively high even though the camera is stably held by the person.

In this embodiment, the vertical and horizontal image shifts are mainly addressed, of which the frequency is estimated to be relatively high. Further, the shake amount of the camera is estimated from the image shift amounts of the subject in the vertical and horizontal directions, such that the image shift of the subject in the photographed image can be suppressed upon actual photographing. Further, the number of detection sensors for detecting the rotation speeds around the X- and Y-axes is reduced. Therefore, current consumption can be reduced and the lifespan of the battery can be extended.

First Embodiment

First, a first embodiment of the invention will be described, in which a single detection sensor is used to estimate the shake amount.

Figure 3:
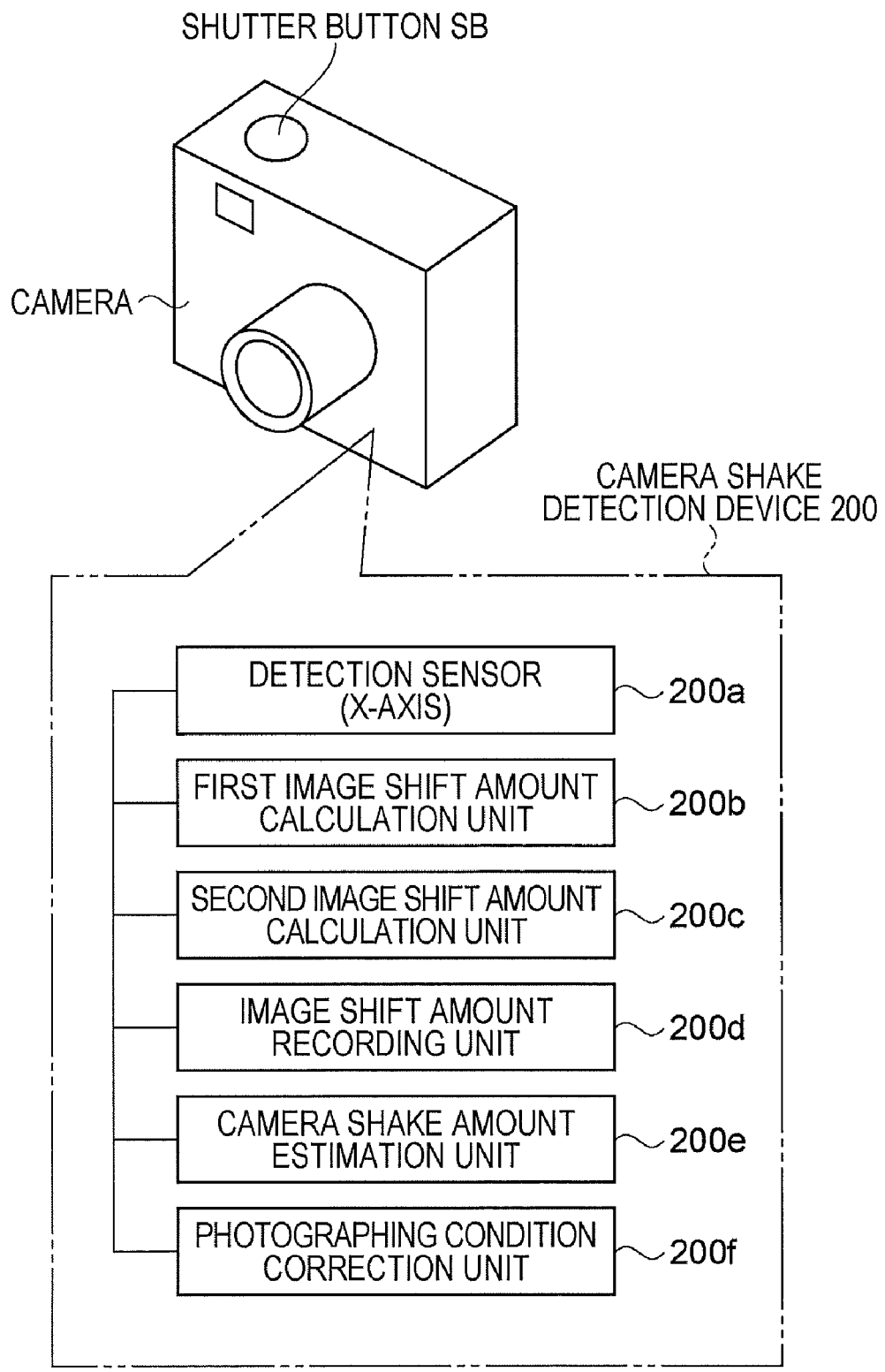
FIG. 3 is a diagram illustrating the functional construction of a shake detection device according to a first embodiment of the invention.

FIG. 3 is an explanatory view illustrating the functional construction of a shake detection device 200 according to the first embodiment that is incorporated into a camera. As shown in FIG. 3, the shake detection device 200 includes a detection sensor unit 200a, a first image shift amount calculation unit 200b, a second image shift amount calculation unit 200c, an image shift amount recording unit 200d, a shake amount estimation unit 200e, and a photographing condition correction unit 200f.

The detection sensor unit 200a detects the rotation speed of the pitch around the X axis described with reference to FIG. 1A. Therefore, the detection sensor unit 200a is a functional block that includes one sensor (hereinafter, referred to as 'X-axis detection sensor'). In this embodiment, the sensor is an angular speed sensor. Other sensors, such as an angular acceleration sensor and an acceleration sensor, may be used insofar as it has a function of measuring a speed around an axis.

The first image shift amount calculation unit 200b calculates a vertical image shift amount based on the rotation speed detected by the detection sensor unit 200a. Further, when the image shift amount is calculated, the first image shift amount calculation unit 200b acquires the field angle and shutter speed of the camera, and the number of vertical pixels of an imaging element when photographing, as described above.

The second image shift amount calculation unit 200c performs a predetermined image analysis on an image photographed by a camera and then calculates a horizontal image shift amount. In this embodiment, as an image analysis method, an image shaft amount is calculated by edge detection in which a change rate in pixel value is reviewed so as to detect the edges of an image. However, the invention is not limited to edge detection, and a known image analysis technology, such as pattern matching or optical flow tracking, may be used to calculate the image shift amount. In pattern matching, the features of an image are reviewed. In optical flow tracking, a constant luminance value of an image is reviewed.

The image shift amount recording unit 200d records the horizontal image shift amount calculated by the second image shift amount calculation unit each time photographing is performed. Therefore, the image shift amount recording unit 200d records the horizontal image shift amounts corresponding to the number of photographing times.

The shake amount estimation unit 200e estimates the shake amount using the vertical and horizontal image shift amounts.

In this embodiment, the vertical direction and the horizontal direction are set to cross each other at right angles. Then, the shake amount estimation unit 200e can calculate the image shift amounts in the directions separate from each other. The shake amount estimation unit 200e sets the vertical and horizontal image shift amounts to vector components crossing each other at right angles and then estimates the image shift amount obtained through vector composition as the shake amount when photographing.

The photographing condition correction unit 200f corrects a photographing condition when the subject is actually photographed by the camera. In this embodiment, a photographing condition, such as the shutter speed and sensitivity, is corrected based on the estimated shake amount. For example, a photographing condition set by a photographer on photographing or a photographing condition automatically set by the camera is corrected based on the estimated shake amount. In addition, a photographing condition of an aperture or flash lighting is considered and is to be corrected, if necessary.

Figure 4:
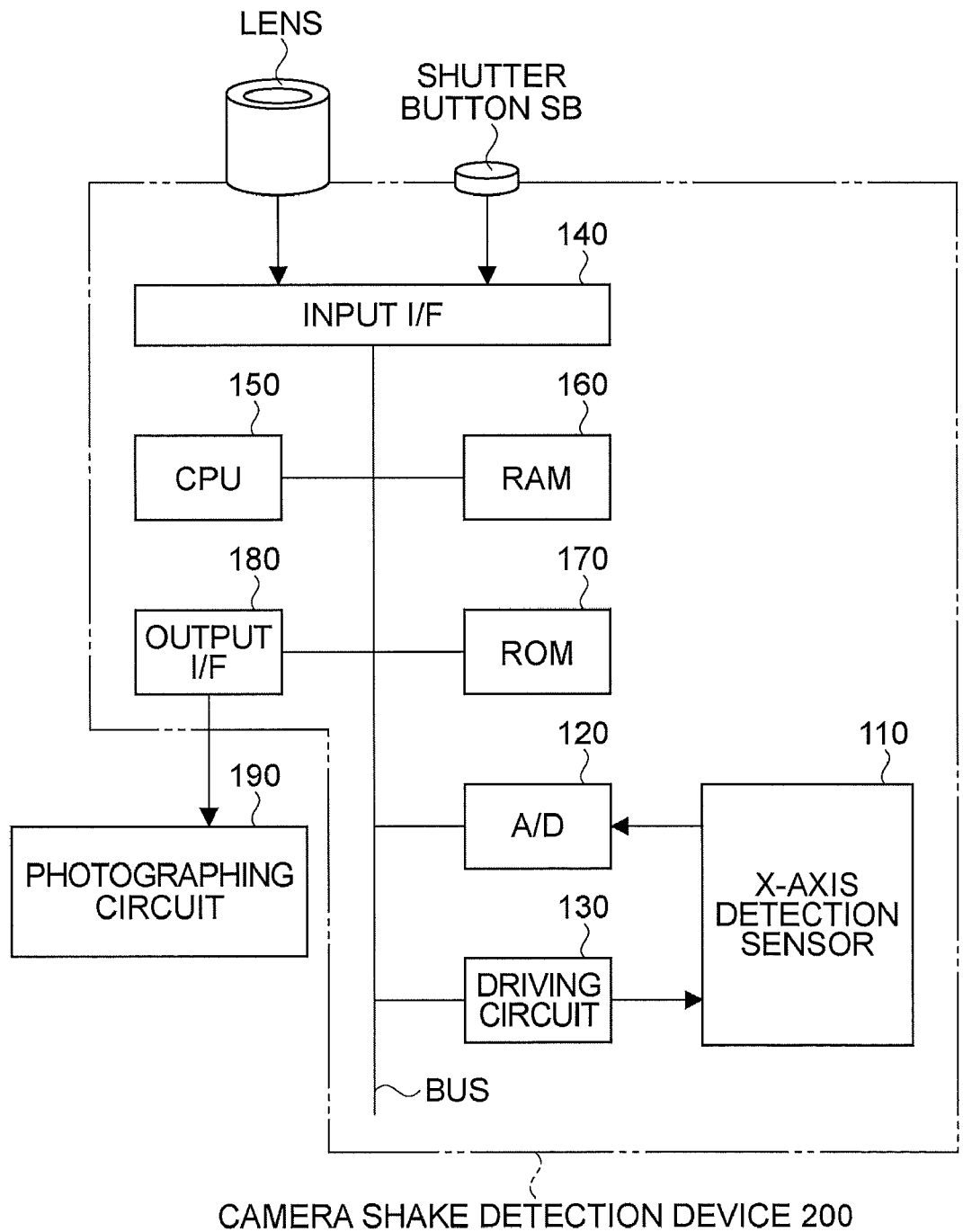
FIG. 4 is a block diagram illustrating the circuit configuration of the shake detection device according to the first embodiment of the invention.

Next, the circuit configuration of the shake detection device 200 will be described. FIG. 4 is a block diagram illustrating the circuit configuration of the shake detection device 200. The shake detection device 200 includes a CPU 150, a RAM 160, a ROM 170, an input interface (I/F) 140, an output interface (I/F) 180, an X-axis detection sensor 110, an analog-to-digital (A/D) converter 120, and a driving circuit 130, all of which are connected to one another through a bus.

The input I/F 140 is an interface for an image taken by an imaging element (not shown) through a lens. Further, the input I/F 140 serves as an interface for a shutter operation of the shutter button SB and converts the image and the shutter operation into predetermined digital signals to be handled by the CPU 150. The driving circuit 130 serves to drive the X-axis detection sensor 110, and the A/D converter 120 serves to convert an analog output from the X-axis detection sensor 110 into a digital output to be handled by the CPU 150. The output I/F 180 serves as an interface that outputs correction data on the photographing condition of the camera to a photographing circuit 190 in the camera. The photographing circuit 190 sets a photographing condition when actual photographing and delivers the image of the subject to an imaging element according to the correction data on the photographing condition of the camera output from the output I/F 180.

The CPU 150 reads out a program stored in the ROM 170 and executes the program under a predetermined operating system. Then, the CPU 150 operates as the above-described respective functional blocks to perform a predetermined processing. The CPU 150 executes a processing shown in a flowchart of FIG. 5. For example, the CPU 150 records digital data into the RAM 160, reads out necessary digital data from the RAM 160 or the ROM 170, if necessary, or outputs predetermined digital data to the photographing circuit 190 through the output I/F 180.

Figure 5:
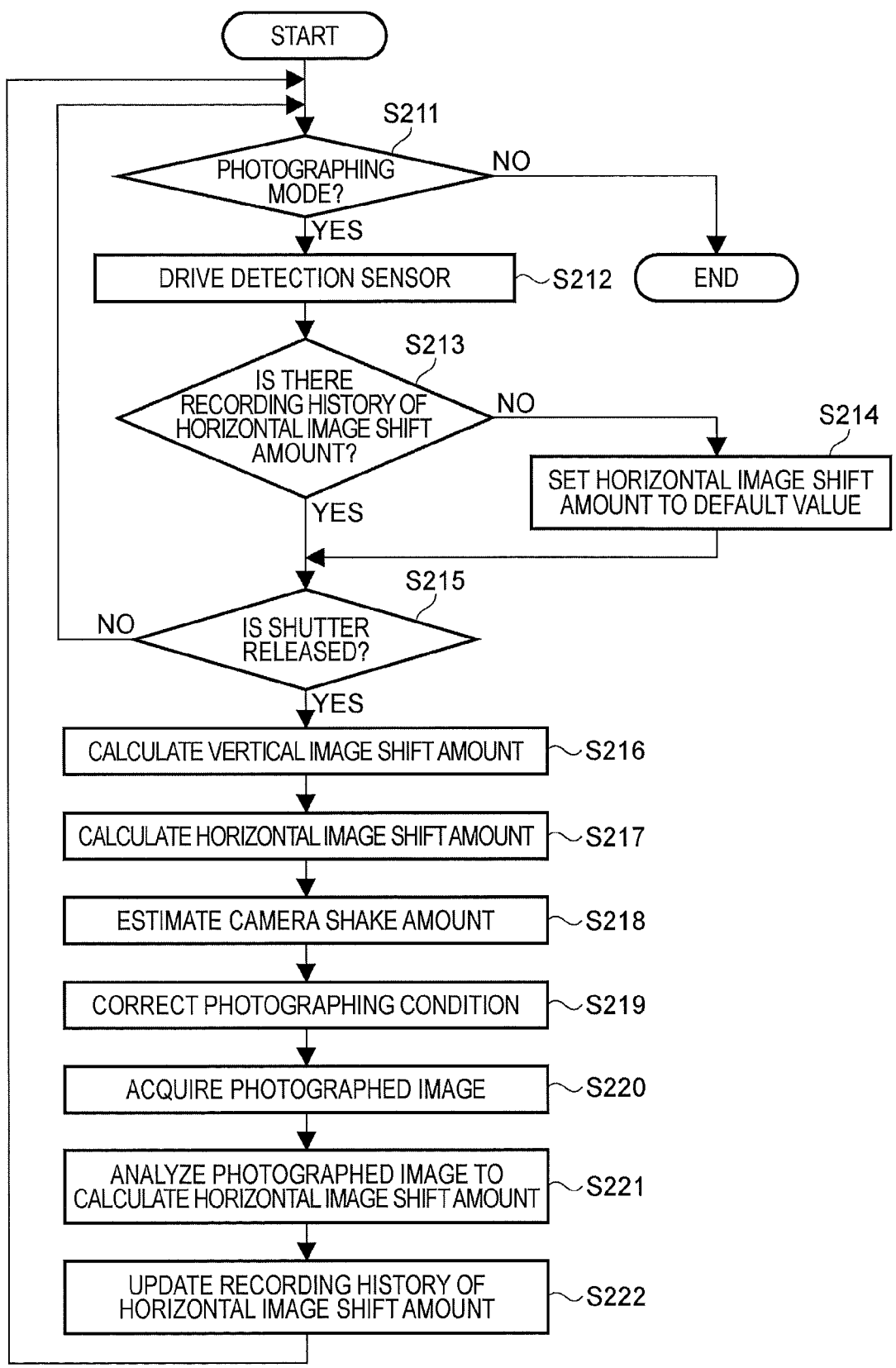
FIG. 5 is a flowchart showing a processing that is executed by the shake detection device according to the first embodiment of the invention.

Now, a processing to be performed by the shake detection device 200 according to the first embodiment will be described with reference to the flowchart of FIG. 5. When the processing begins, at Step S211, it is first judged whether or not the camera is in a photographing mode. In this embodiment, the CPU 150 judges, as the photographing mode, a state where the power supply of a camera is turned on by a power supply switch (not shown). When the camera has a function of selecting the photographing mode, the judgment may be performed according to selection information read by the CPU 150.

Next, if it is judged that it is in the photographing mode (Step S211: YES), the CPU 150 drives the detection sensor (Step S212). Meanwhile, if it is judged that it is not the photographing mode (Step S211: NO), the CPU 150 terminates the processing.

Next, at Step S213, it is judged whether or not there is a recording history of the horizontal image shift amount. When no horizontal image shift amount is recorded (S213: NO), the horizontal image shift amount is set to a default value (Step S214). When photographing is first performed, the recording history of the horizontal image shift amount is not updated because Step S222 described below is not performed yet. Accordingly, when there is no recording history of the horizontal image shift amount, the default value is used. The default value may be previously stored in the ROM 170. Alternatively, the photographer may input the default value using an input unit (now shown) provided in the camera to be then stored in the RAM 160.

Next, at Step S215, it is judged whether or not the shutter is released. When receiving a shutter operation signal of the shutter button SB through the input I/F 140, the CPU 150 judges that the shutter is released. Then, if it is judged that the shutter is released (S215: YES), a processing after Step S216 is performed. Meanwhile, if it is judged that the shutter is not released (S215: NO), the process returns to Step S211, and the processing to Step S215 is repeated.

When the shutter is released, at Step S216, the vertical image shift amount is calculated. The CPU 150 calculates the vertical image shift amount as the number of pixels from digital data on the rotation speed detected by the driven X-axis detection sensor 110 when photographing, the field angle and shutter speed of the camera when photographing, and the number of vertical pixels of the imaging element.

Next, at Step S217, the horizontal image shift amount is calculated. When photographing is first performed, the CPU 150 reads out the default value stored in the ROM 170 and calculates the default value as the horizontal image shift amount, as described above. Meanwhile, when photographing is performed a second time or later, the CPU 150 reads out the horizontal image shift amount to be recorded at Step S222 described below, and then calculates an image shift amount calculated by a predetermined method as a horizontal image shift amount.

In this embodiment, a method of calculating a simple average of the recorded horizontal image shift amounts is used. In addition, a calculation method may be selected according to a variation among the recorded horizontal image shift amounts. For example, a calculation method of selecting an amount of which the frequency is high or a method of calculating an average through weighting may be selected. Alternatively, one predetermined horizontal image shift amount, such as a horizontal image shift amount recorded first or last, or the largest horizontal image shift amount among the recorded horizontal image shift amounts, may be calculated as the horizontal image shift amount when photographing is performed a second time or later.

Next, the shake amount is estimated using the vertical image shift amount calculated at Step S216 and the horizontal image shift amount calculated at Step S217 (Step S218). In this embodiment, the image shift amount obtained by vector composition of the vertical image shift amount and the horizontal image shift amount is estimated as the shake amount, as described above.

Next, at Step S219, a photographing condition is corrected. Based on the estimated shake amount, the CPU 150 corrects the shutter speed and sensitivity in the photographing condition when actual photographing. For example, the number of pixels which enable one to notice that the image of the subject is shifted in the photographed image is set to the reference number of pixels, and a ratio of the number of pixels estimated as the shake amount to the reference number of pixels is calculated. Then, correction is performed such that the shutter speed for a time corresponding to the ratio increases. Further, since the exposure becomes insufficient as the shutter speed increases, the sensitivity is corrected so as to compensate for the insufficient exposure. Thereafter, the CPU 150 outputs the correction photographing condition to the photographing circuit 190 in the camera.

Next, at Steps S220 to S222, the horizontal image shift amount is calculated using an image actually photographed. First, at Step S220, a photographed image is acquired. The CPU 150 stores image data taken by the imaging element in the RAM 160 through the input I/F 140, thereby acquiring the photographed image.

Next, at Step S221, the photographed image is analyzed so as to calculate the horizontal image shift amount. The CPU 150 reads out the stored photographed image and performs the edge detection, as described above. The CPU 150 reads out from the photographed image the number of pixels between the edges in the horizontal direction, thereby calculating the horizontal image shift amount. At this time, the CPU 150 reads out the numbers of pixels between the edges in the entire pixel region of the photographed image, the edges of which are detected, and then calculates the largest number of pixels among them as the horizontal image shift amount. However, the invention is not limited thereto. For example, the number of pixels between the edges in only a predetermined image region, such as left and right end portions, may be read. Further, an average value of the read number of pixels may be set to the horizontal image shift amount.

In many cases, the image shift amount to be generated in a typical photographed image is not more than dozens of pixels. Therefore, when the number of pixels between the edges is not more than a predetermined number of pixels, for example, twenty, the number of pixels may be read as the horizontal image shift amount. Then, a processing load is reduced, and efficiency of the calculation of the horizontal image shift amount increases.

Next, at Step S222, the recording history of the horizontal image shift amount is updated. The CPU 150 stores the horizontal image shift amount calculated at Step S221 in a predetermined recording region of the RAM 160. Through this processing, the recording history of the horizontal image shift amount is updated.

Thereafter, the process returns to Step S211. The processing from Steps S211 to S222 is repeated when next photographing. Then, the shake amount when photographing is estimated so as to suppress the image shift of the subject occurring in the photographed image.

The processing in the first embodiment has been described above using a flowchart. As will be apparent from the description, according to the first embodiment, the shake amount is estimated using the horizontal image shift amount calculated by analyzing the image actually photographed, and the vertical image shift amount calculated by the detection sensor. Therefore, the image shift amount to be generated in the photographed image can be suppressed by a single detection sensor, and current consumption when driving the detection sensor can be suppressed. Therefore, it is possible to provide a shake detection device that suppresses the image shift of the subject and extends the lifespan of a battery.

Second Embodiment

Next, a second embodiment of the invention will be described, which estimates the shake amount using two detection sensors.

Figure 6:
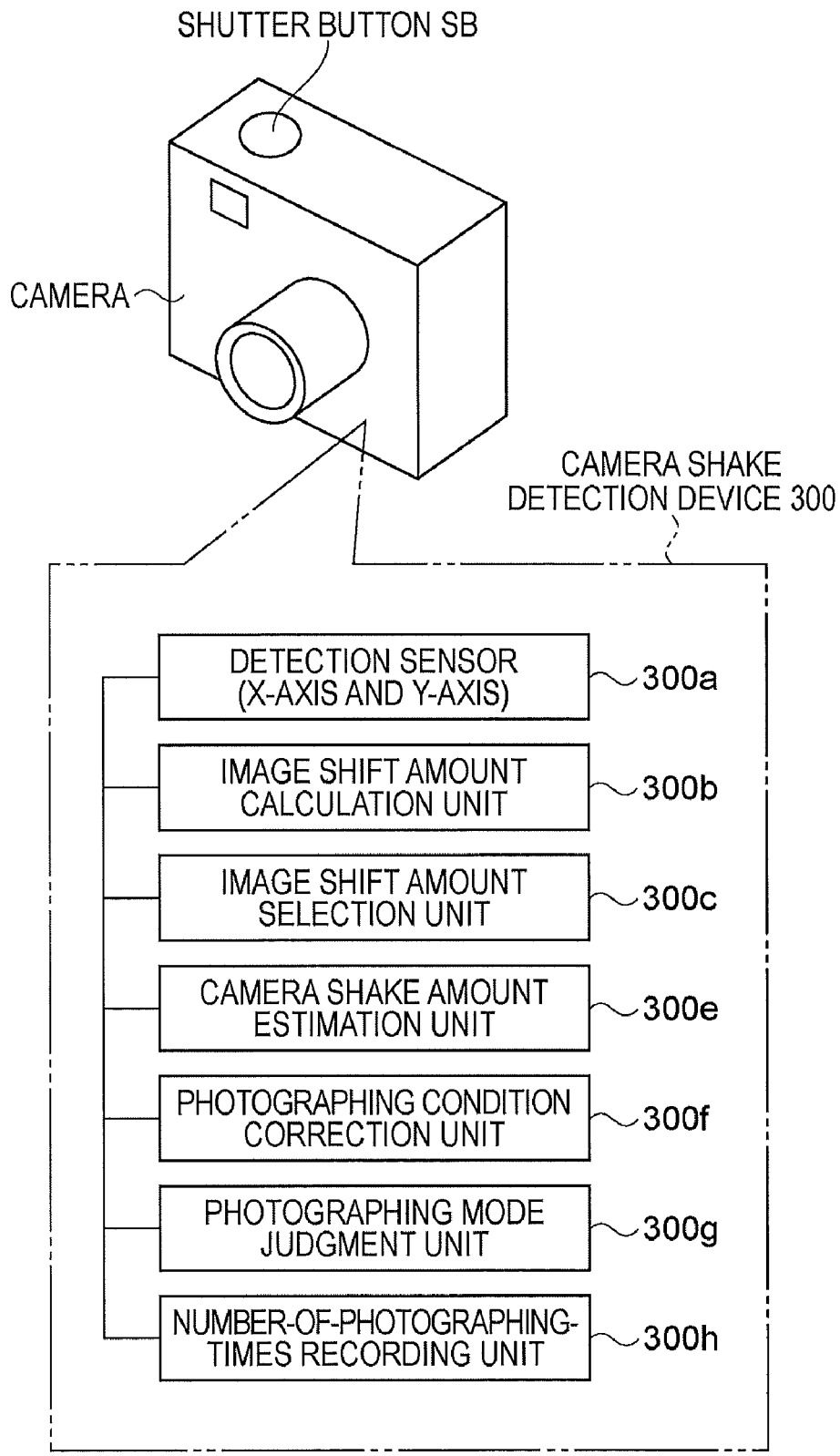
FIG. 6 is a diagram illustrating the functional construction of a shake detection device according to a second embodiment of the invention.

FIG. 6 is a diagram illustrating the functional configuration of a shake detection device 300 according to the second embodiment, which is incorporated into the camera. As shown in FIG. 6, the shake detection device 300 includes a detection sensor unit 300a, an image shift amount calculation unit 300b, an image shift amount selection unit 300c, a shake amount estimation unit 300e, a photographing condition correction unit 300f, a photographing mode judgment unit 300g, and a photographing number recording unit 300h.

The detection sensor unit 300a detects the rotation speeds of the pitch around the X axis and the roll around the Y axis, as shown in FIG. 1. Accordingly, the detection sensor unit 300a is a functional block that includes two sensors. Similarly to the first embodiment, the sensors all are angular speed sensors. Other sensors, such as an angular acceleration sensor and an acceleration sensor, may be used insofar as it has a function of measuring a speed around an axis. The sensor for detecting the rotation speed of the roll around the Y axis is hereinafter referred to as 'Y-axis detection sensor'.

The image shift amount calculation unit 300b drives the detection sensor unit 300a so as to calculate a vertical image shift amount and a horizontal image shift amount based on the detected rotation speeds. When an image shift amount is calculated, the image shift amount calculation unit 300b acquires the field angle and shutter speed of the camera when photographing and the numbers of vertical and horizontal pixels of the imaging element.

The image shift amount selection unit 300c compares horizontal and vertical image shift amounts calculated by the image shift amount calculation unit 300b and then specifies which of the image shift amounts is larger.

The shake amount estimation unit 300e estimates the shake amount using the vertical image shift amount and the horizontal image shift amount. In this embodiment, the vertical direction and the horizontal direction are set to cross each other at right angles, similarly to the first embodiment. Then, the image shift amounts that are independent from each other can be calculated. Accordingly, the shake amount estimation unit 300e sets the vertical and horizontal image shift amounts to vector components crossing each other at right angles and then estimates the image shift amount through vector composition as the shake amount when photographing.

Similarly to the photographing condition correction unit 200f of the first embodiment, the photographing condition correction unit 300f corrects the photographing condition of the camera that is set when photographing is actually performed. Even in this embodiment, a photographing condition, such as a shutter speed and sensitivity, is corrected based on the estimated shake amount, similarly to the first embodiment. For example, a photographing condition set by a photographer when photographing or a photographing condition that is automatically set by the camera is corrected based on the estimated shake amount.

The photographing mode judgment unit 300g judges whether or not the state of the camera is a photographing mode in which the subject can be photographed when the shutter button is pressed so as to release the shutter. In this embodiment, a state where the power supply of the camera is turned on is judged as the photographing mode. When the camera has a function of selecting the photographing mode, the judgment may be performed according to selection information.

After the photographing mode judgment unit 300g judges that it is in the photographing mode, the photographing number recording unit 300h records how many times the shutter is released, that is, the number of photographing times of the subject. Accordingly, when photographing is performed, it can be judged what times photographing is performed in the photographing mode.

Figure 7:
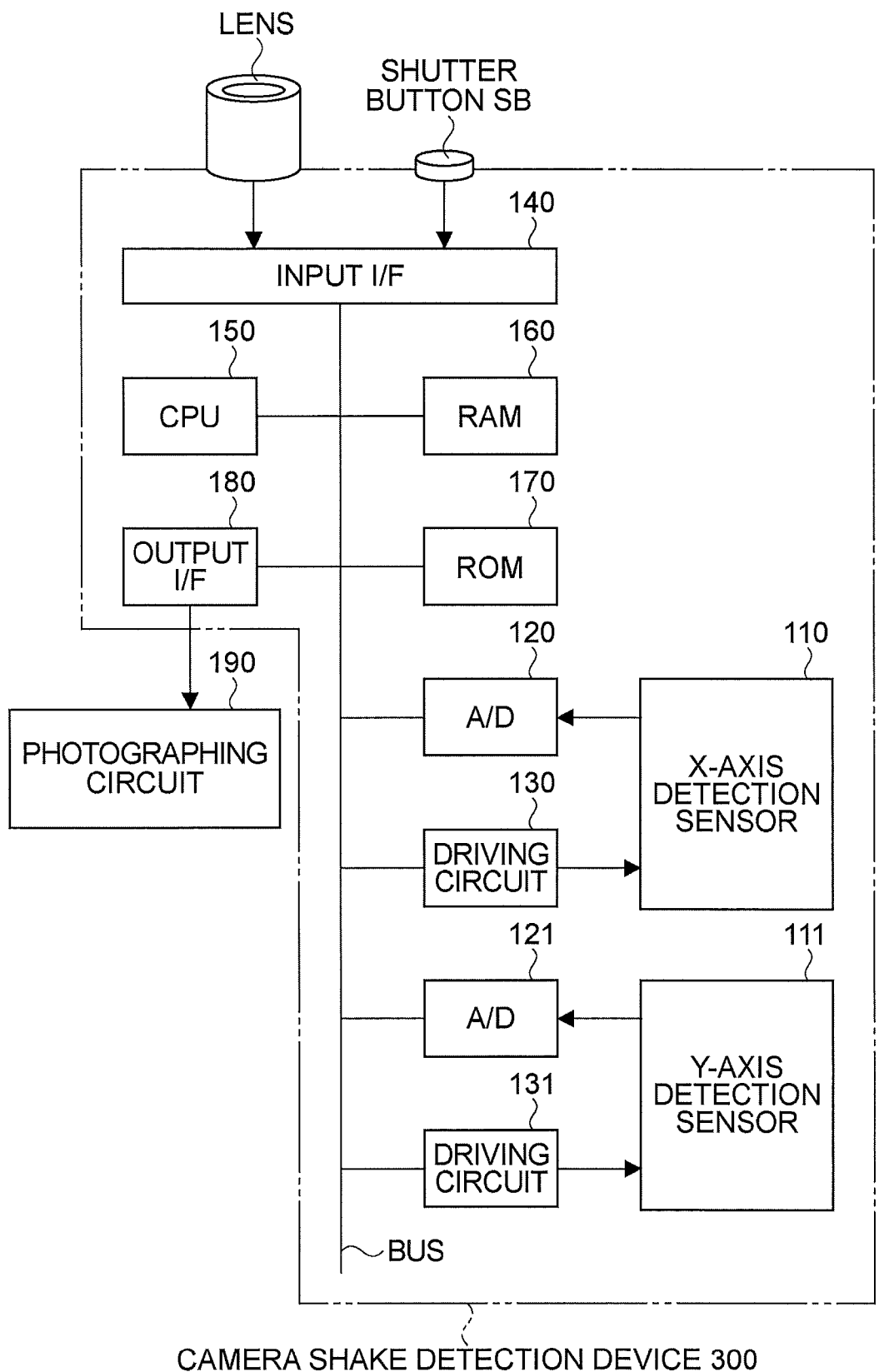
FIG. 7 is a block diagram illustrating the circuit configuration of the shake detection device according to the second embodiment of the invention.

Next, the circuit configuration of the shake detection device 300 will be described. FIG. 7 is a block diagram illustrating the circuit configuration of the shake detection device 300. The shake detection device 300 includes a Y-axis detection sensor 111, a driving circuit 131, and an analog-to-digital (A/D) converter 121, all of which are added to the shake detection device 200 shown in FIG. 4.

The driving circuit 131 serves to drive the Y-axis detection sensor 111, and the A/D converter 121 serves to convert an analog output from the Y-axis detection sensor 111 to a digital output to be handled by the CPU 150. Other circuit components, such as the CPU 150 and the like, are the same as those of the first embodiment shown in FIG. 4, and thus a description thereof will be omitted.

The CPU 150 reads out a program stored in the ROM 170 and then executes the program under a predetermined operating system. Then, the CPU 150 operates as the above-described respective functional blocks to perform a predetermined processing. If necessary, the CPU 150 records digital data into the RAM 160, reads out necessary digital data from the RAM 160 or the ROM 170, or outputs predetermined digital data to the photographing circuit 190 through the output I/F 180, thereby executing a processing shown in a flowchart of FIG. 8.

Figure 8:
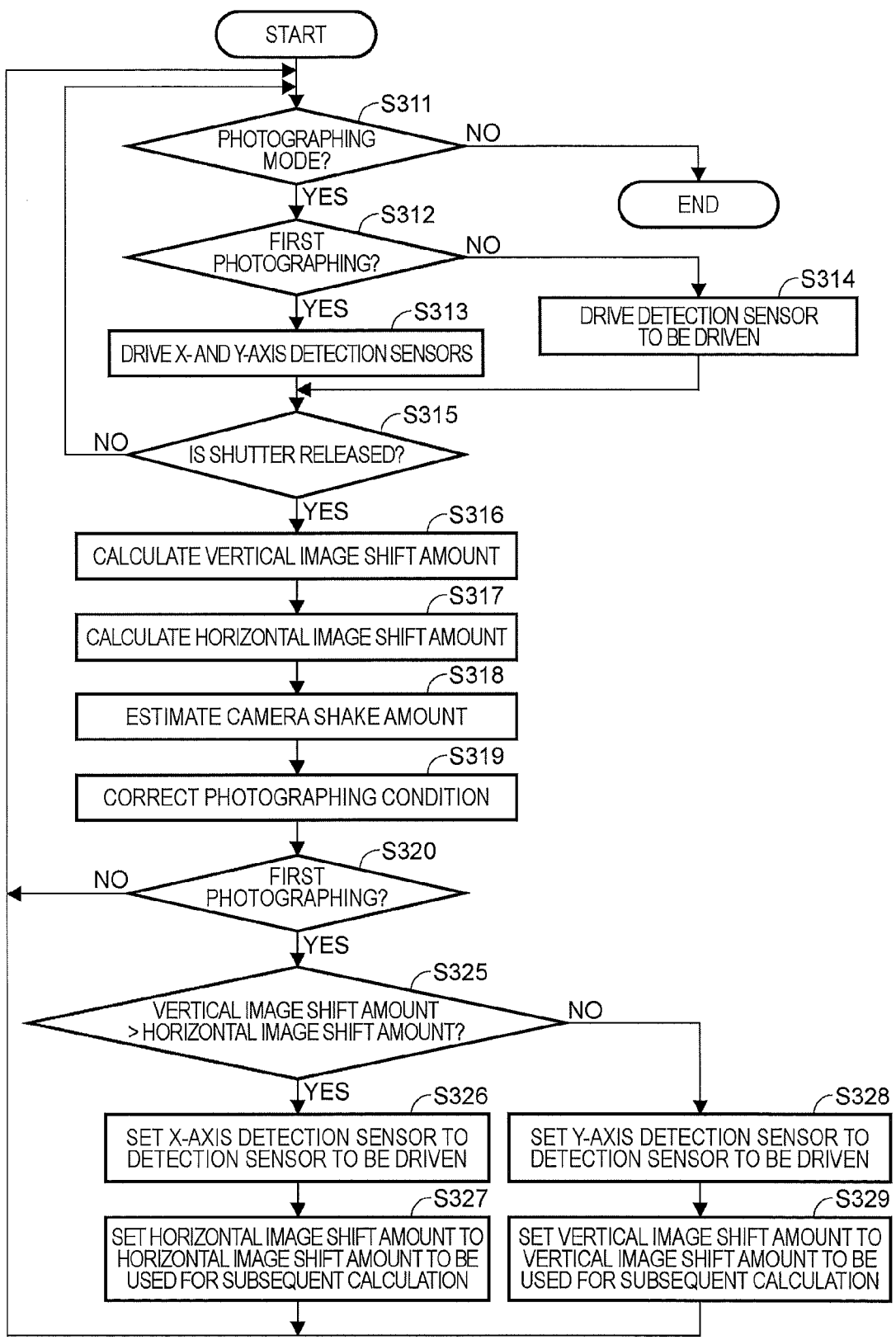
FIG. 8 is a flowchart showing a processing that is executed by the shake detection device according to the second embodiment of the invention.

The processing that is executed by the shake detection device 300 according to the second embodiment will now be described with reference to the flowchart of FIG. 8. When the processing begins, at Step S311, it is first judged whether or not it is in the photographing mode. In this embodiment, the CPU 150 judges, as the photographing mode, a state where the power supply of the camera is turned on by a power supply switch (not shown).

Next, if it is judged that it is in the photographing mode (S311: YES), the CPU 150 judges whether or not photographing is first performed (Step S312). Meanwhile, if it is judged that the power supply of the camera is cut off and it is not the photographing mode (S311: NO), the CPU 150 terminates the process.

At Step S312, when receiving a shutter operation signal of the shutter button SB through the input I/F 140, the CPU 150 notes that the shutter is released. Then, the CPU 150 writes data into a predetermined recording region of the RAM 160, thereby storing the number of photographing times. Accordingly, prior to writing, the CPU 150 reads data stored in a predetermined recording region so as to judge the number of photographing times. When stored data is not present, the CPU 150 judges that photographing is first performed.

If it is judged that photographing is first performed (S312: YES), the two X- and Y-axis detection sensors are driven (Step S313). The CPU 150 causes the driving circuits 130 and 131 to drive the X-axis detection sensor 110 and the Y-axis detection sensor 111, respectively.

Meanwhile, if it is judged that photographing is not first performed (S312: NO), a detection sensor to be driven is driven (Step S314). The detection sensor to be driven is one of the X-axis detection sensor 110 and the Y-axis detection sensor 111. The detection sensor is selected by a processing from Steps S325 to S329, which are performed when photographing is first performed. The processing from Steps S325 to S329 will be described below.

Next, at Step S315, it is judged whether or not the shutter is released. As described above, when receiving the shutter operation signal of the shutter button SB through the input I/F 140, the CPU 150 judges that the shutter is released. If it is judged that the shutter is released (S315: YES), the process proceeds to the processing after Step S316. Meanwhile, if it is judged that the shutter is not released (S315: NO), the process returns to Step S311, and then the processing to Step S315 is repeated.

When the shutter is released, the vertical image shift amount is calculated at Step S316, and the horizontal image shift amount is then calculated at Step S317. At this time, when photographing is first performed, the two detection sensors are driven at Step S313, as described above. Meanwhile, when photographing is performed a second time or later, only one detection sensor to be driven is driven. Accordingly, between the time when photographing is first performed and the time when photographing is performed a second time or later, the contents of the image shift amount calculation that are performed at Steps S316 and 317 are different from each other.

First, the contents of the processing that is performed when photographing is first performed will be described. When photographing is first performed, at Step S316, the CPU 150 calculates the vertical image shift amount as the number of pixels from digital data on the rotation speed detected by the X-axis detection sensor 110 when photographing, the field angle and shutter speed of the camera when photographing, and the number of vertical pixels of the imaging element.

Next, at Step S317, the CPU 150 calculates the horizontal image shift amount as the number of pixels from the digital data on the rotation speed detected by the Y-axis detection sensor 111 when photographing, the field angle and shutter speed of the camera when photographing, and the number of horizontal pixels of the imaging element.

Then, at Step S318, the shake amount is estimated using the vertical image shift amount calculated at Step S316 and the horizontal image shift amount calculated at Step S317. In this embodiment, the image shift amount obtained through vector composition of the vertical and horizontal image shift amounts is estimated as the shake amount, as described above.

Next, at Step S319, a photographing condition is corrected. Based on the estimated shake amount, the CPU 150 corrects the photographing condition, such as the shutter speed and sensitivity when actual photographing. For example, the number of pixels when one can notice that the image of the subject is shifted in the photographed image is set to the reference number of pixels, and a ratio of the number of pixels estimated as the shake amount to the reference number of pixels is calculated. Then, correction is performed such that the shutter speed for a time corresponding to the ratio increases. Further, since exposure becomes insufficient as the shutter speed increases, the sensitivity is corrected so as to compensate for the insufficient exposure. Thereafter, the CPU 150 outputs the correction photographing condition to the photographing circuit 190 in the camera.

Next, at Step S320, it is again judged whether or not photographing is first performed. If it is judged that photographing is first performed (S320: YES), it is judged whether or not the vertical image shift amount is larger than the horizontal image shift amount (Step S325). Then, when the vertical image shift amount is larger than the horizontal image shift amount (S325: YES), a processing from Step S326 to Step S327 is executed. When the horizontal image shift amount is larger than the vertical image shift amount (S325: NO), a processing from Step S328 to Step S329 is executed.

When the vertical image shift amount is larger than the horizontal image shift amount, at Step S326, the X-axis detection sensor to be used for calculating the vertical image shift amount is set as the detection sensor to be driven. Then, at Step S327, the horizontal image shift amount is set as the horizontal image shift amount to be used in the subsequent calculation. Through the processing, when photographing is performed a second time or later, only the X-axis detection sensor is driven at Step 314. Further, the horizontal image shift amount calculated when photographing is first performed is used at Step 317 as it is.

Meanwhile, when the horizontal image shift amount is larger than the vertical image shift amount, at Step S328, the Y-axis detection sensor to be used for calculating the horizontal image shift amount is set as the detection sensor to be driven. Then, at Step S329, the vertical image shift amount is set to the vertical image shift amount to be used in the subsequent calculation. Through the processing, when photographing is performed a second time or later, only the Y-axis detection sensor is driven at Step 314. Further, the vertical image shift amount calculated when photographing is first performed is used at Step 317 as it is.

When the above-described processing (from Step S325 to Step S329) upon first photographing ends, the process returns to Step S311, and then a processing upon second photographing or later is executed. Hereinafter, a difference between the time when photographing is performed a second time and later and the time when photographing is first performed will be mainly described.

If it is judged at Step S311 that the photographing mode is continued (YES), only one detection sensor to be driven is driven at Step S314 because photographing is performed a second time and later (S312: NO). As described above, the detection sensor to be driven is judged at Step S326 or S328 such that any one of the X-axis detection sensor and the Y-axis detection sensors becomes the detection sensor to be driven.

Further, when the shutter is released (Step S315: YES), the processing of Steps S316 and S317 is performed. At this time, one of the vertical and horizontal image shift amounts is calculated using the image shift amount in the same direction calculated when first photographing, and the other is calculated using a detection sensor to be driven at Step S327 or S329.

When it is judged that the vertical image shift amount is larger when first photographing, the X-axis detection sensor is driven at Step S314. Further, at Step S317, the horizontal image shift amount calculated when first photographing is calculated as the horizontal image shift amount when photographing is performed a second time and later.

Thereafter, the shake amount is estimated at Step S318, and the photographing condition is corrected at Step S319. When it is judged that photographing is performed a second time and later (S320: NO), the process returns to Step S311 so as to judge the photographing mode, and the above-described processing when second photographing and later is repeated. Then, if the photographing mode ends (S311: NO), the processing of the shake detection device according to the second embodiment ends.

The processing in the second embodiment has been described above with reference to the flowchart. As will be apparent from the description, according to the second embodiment, when the photographing mode is continued, the two detection sensors are driven when first photographing, such that the shake amount is estimated. Further, when photographing is performed a second time and later, only one detection sensor corresponding to a direction where an image shift amount is judged to be larger when first photographing is driven, thereby estimating the shake amount. Accordingly, when photographing is performed a second time and later, the image shift amount to be generated in the photographed image can be suppressed by one detection sensor, and current consumption when driving the detection sensor can be suppressed. Therefore, it is possible to provide a shake detection device that suppresses the image shift of the subject and extends the lifespan of a battery.

According to the first and second embodiments of the invention, it is possible to provide a shake detection device that uses a detection sensor to suppress the image shift of the subject to be generated in the photographed image and to extend the lifespan of a battery.

Although the invention has been described by way of the above-described embodiments, the invention is not limited to these embodiments. Various modifications and changes can be made by those skilled in the art without departing from the spirit and scope of the invention.

First Modification

In the first embodiment, one detection sensor to be driven is set to the X-axis detection sensor that detects the rotation speed of the pitch around the X axis described with reference to FIG. 1A. As a first modification, however, the direction of a detection axis may be controlled such that a rotation speed in a direction where the largest shake occurs upon photographing is detected.

If so, since the detection axis of the detection sensor can be changed, the detection sensor can measure the largest shake that occurs upon photographing. Accordingly, it is possible to expect that a shake amount to be estimated approaches a shake amount to be actually generated. Therefore, a photographing condition can be corrected with a high possibility such that an image shift amount of a subject is correctly suppressed.

FIG. 9 is an explanatory view illustrating the outline of this modification. For ease of explanation, it is assumed that a photographed image is displayed on a liquid crystal monitor provided at the back of the camera. Further, it is assumed that the camera is provided with a detection sensor to be described below and a control knob for controlling the detection axis direction of the detection sensor. Of course, the detection sensor detects a rotation speed around the detection axis.

Figure 9A:
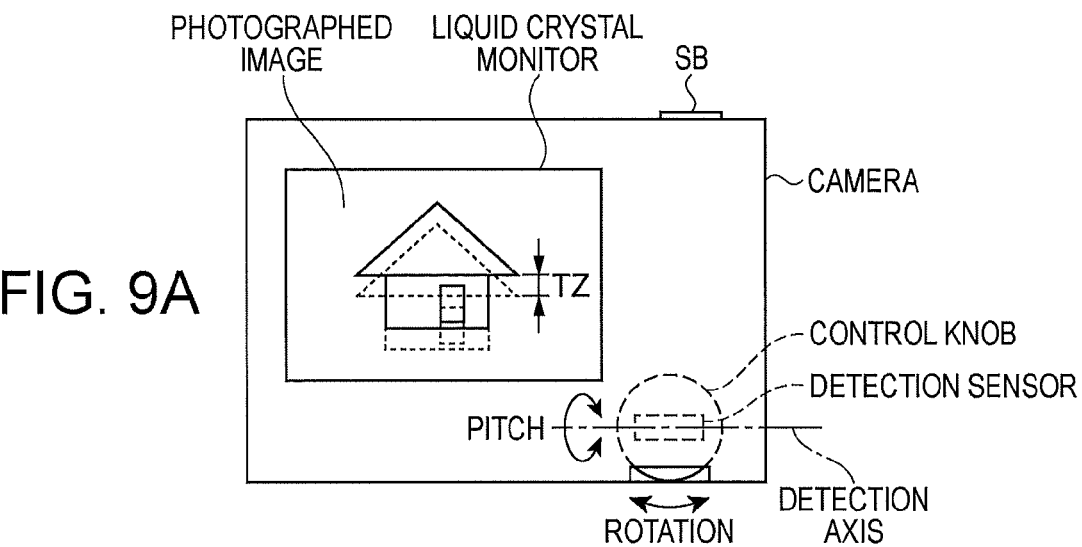
FIGS. 9A to 9C are diagrams illustrating the outline of a first modification.

In such a camera, when a vertical shake occurs upon photographing, an image of a subject is shifted by a vertical image shift amount TZ, as shown in FIG. 9A. In this case, if the control knob is rotated such that the detection axis direction of the detection sensor is controlled to be set to the X-axis where the pitch is detected, the detection sensor can detect the shake of the camera.

Figure 9B:
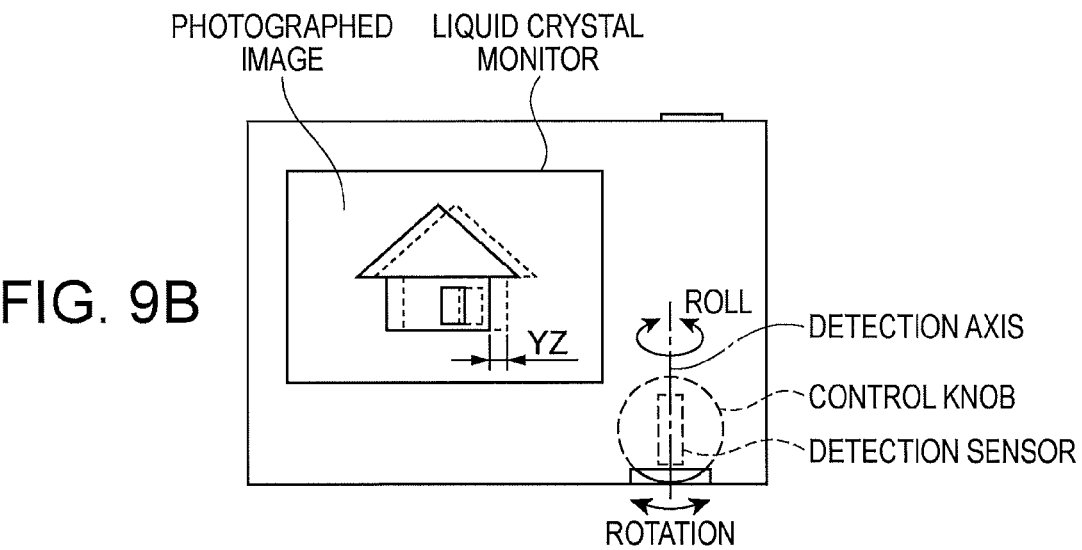

Meanwhile, when a horizontal shake occurs upon photographing, the image of the subject is shifted by a horizontal image shift amount YZ, as shown in FIG. 9B. In this case, if the control knob is rotated such that the detection axis direction of the detection sensor is controlled to be set to the Y-axis where the roll is detected, the detection sensor can detect the shake of the camera.

Figure 9C:
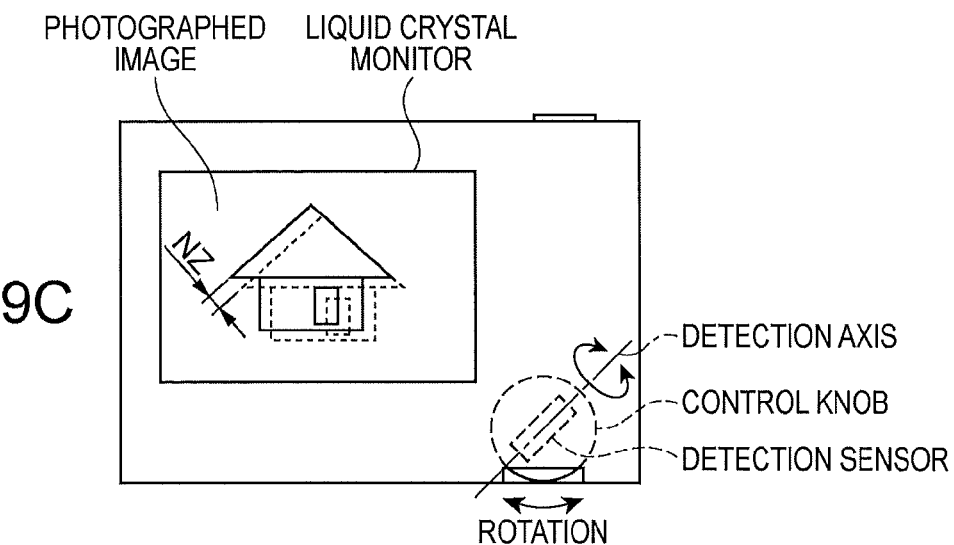

In many cases, however, the above-described vertical and horizontal shakes occur at the same time in a typical camera. In this case, the largest shake occurs in a direction of the vector composition of vertical and horizontal shifts. For example, as shown in FIG. 9C, the image of the subject is shifted by an image shift amount NZ in an oblique direction that is the composition direction. In this case, if the control knob is rotated such that the detection axis direction of the detection sensor is controlled to be set to a direction orthogonal to the composition direction, the detection sensor can detect a shake of the camera.

In this modification, the detection axis direction of the detection sensor can be controlled in a direction orthogonal to a direction where the image shift of the subject occurring upon photographing is the largest. Then, the largest shake is detected by one detection sensor such that the image shift amount of the subject to be generated in the photographed image is suppressed. Hereinafter, this modification will be described in detail with reference to FIGS. 10 to 13.

Figure 10:
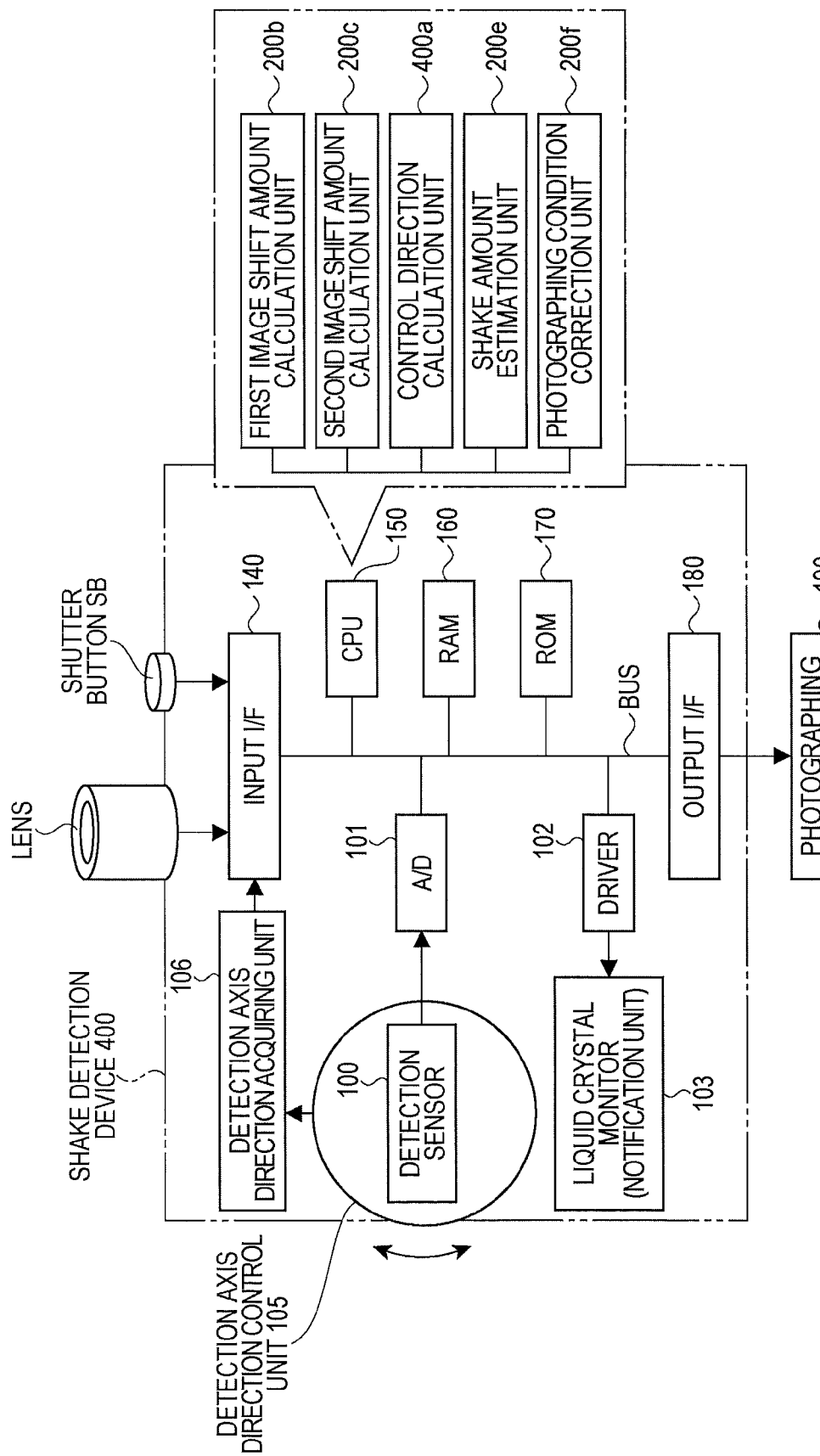
FIG. 10 is an explanatory view illustrating the functional configuration of a shake detection device according to the first modification.

FIG. 10 is a block diagram illustrating the functional configuration of a shake detection device 400 that is incorporated into a camera. As shown in FIG. 10, the shake detection device 400 includes a CPU 150, a RAM 160, a ROM 170, an input interface (I/F) 140, an output interface (I/F) 180, a detection sensor 100, an analog-to-digital converter 101, and a driver 102, all of which are connected to each other through a bus. Further, the shake detection device 400 includes a detection axis direction control unit 105, a detection axis direction acquiring unit 106, and a liquid crystal monitor 103 serving as a notification unit. Moreover, the same parts as those in the first embodiment are represented by the same reference numerals (see FIG. 4), and a description thereof will be omitted.

The detection sensor 100 is rotated as the detection axis direction control unit 105 rotates, such that the detection axis direction thereof can be controlled. In this modification, the detection axis direction control unit 105 has a function of controlling the detection axis direction using the control knob shown in FIG. 9. Of course, the invention is not limited thereto, but the detection axis direction may be controlled by providing a worm and a worm gear and rotating a worm shaft using a screwdriver tool. The detection sensor 100 is a sensor that detects a rotation speed. In this modification, similarly to the first embodiment, the detection sensor is an angular speed sensor. Moreover, of course, the detection sensor 100 is driven by a driving circuit (not shown), similarly to the first embodiment.

The detection axis direction acquiring unit 106 is configured so as to acquire the controlled detection axis direction with a camera being a reference. A known technique that can detect a position may be used so as to acquire the detection axis direction. For example, a counter that operates in connection with the control knob may be used, an encoder may be provided in the control knob, or a protrusion may be provided in a portion of the control knob to open and close a contact point of a micro switch or the like.

In this modification, the input I/F 140 functions as an interface of the acquisition result by the detection axis direction acquiring unit 106. Further, the input I/F 140 converts the acquisition result into a predetermined digital signal to be handled by the CPU 150. The driver 102 is a display driving circuit that displays a predetermined image on the liquid crystal monitor 103. The A/D converter 101 is a conversion circuit that converts an analog output from the detection sensor 100 into a digital output to be handled by the CPU 150.

In this modification, the CPU 150 reads out a program stored in the ROM 170, if necessary, and executes the program under a predetermined operating system. Then, the CPU 150 functions as a first image shift amount calculation unit 200b, a second image shift amount calculation unit 200c, a control direction calculation unit 400a, a shake amount estimation unit 200e, and a photographing condition correction unit 200f, as shown in FIG. 10.

The first image shift amount calculation unit 200b, the second image shift amount calculation unit 200c, the shake amount estimation unit 200e, and the photographing condition correction unit 200f execute the same functions as those in the first embodiment, and thus a description thereof will be omitted. Moreover, in this modification, the shake amount estimation unit 200e estimates the shake amount of the camera using the image shift amount calculated based on the rotation speed detected by the detection sensor 100.

The control direction calculation unit 400a uses a first image shift amount and a second image shift amount so as to calculate a direction that is the detection axis direction in which the largest shake can be detected. Thereafter, the calculation result is displayed as a control direction to be controlled on the liquid crystal monitor 103 serving as a notification unit through the driver 120.

Hereinafter, a processing related to control of the detection axis direction that is performed by the shake detection device 400 of this modification having the above-described functional block will be described with reference to a flowchart shown in FIG. 11.

If the processing starts, it is judged at Step 411 whether or not it is a detection axis control mode or not. In this modification, the CPU 150 judges whether or not the detection axis control mode is selected by a photographer using a mode selection button (not shown). Of course, at a predetermined number of photographing times after power is turned on, the detection axis control mode may be set as a default.

Next, if it is judged that it is the detection axis control mode (Step S411: YES), the CPU 150 judges whether or not a shutter is released or not (Step S412). Meanwhile, if it is judged that it is not the detection axis control mode (Step S411: NO), the process proceeds to Step S420 such that a photographing mode processing is executed. The photographing mode processing will be described below with reference to FIG. 13.

Next, at Step S412, the CPU 150 receives a shutter operation signal of the shutter button SB through the input I/F 140. If it is judged that the shutter is released (Step S412: YES), the process proceeds to Step S413 such that Step S413 and later are performed. Meanwhile, if it is judged that the shutter is not released (Step S412: NO), the process returns to Step S412, and Step S412 is repeated.

If it is judged that the shutter is released (Step S412: YES), at next Step S413, an image shift amount in a direction orthogonal to the detection axis is calculated. The CPU 150 acquires the detection axis direction from the detection axis direction acquiring unit 106 through the input I/F 140. Then, the CPU 150 calculates, as the number of pixels, an image shift amount in the direction orthogonal to the detection axis direction from digital data of the rotation speed detected by the detection sensor 100 upon photographing, the field angle and shutter speed of the camera upon photographing, and the number of vertical and horizontal pixels of the imaging element.

Next, at Step S414, a photographed image is obtained. The CPU 150 stores image data, which is taken by the imaging element through the input I/F 140, into the RAM 160, thereby acquiring the photographed image.

Next, at Step S415, an image analysis is performed on the photographed image such that the image shift amount in the detection axis direction is calculated. Similarly to the first embodiment, the CPU 150 reads out the stored photographed image and performs an edge detection processing. Thereafter, the CPU 150 reads out the number of pixels between edges in the detection axis direction from the photographed image, thereby calculating the image shift amount.

At Step S413 or S415, as shown in FIG. 9C, when the detection axis direction is an oblique direction, the number of vertical pixels and the number of horizontal pixels are calculated as the number of pixels between the edges. Therefore, in this case, a square root of the sum of a square of the number of vertical pixels and a square of the number of horizontal pixels is calculated and used as the image shift amount.

Next, at Step S416, the control direction of the detection axis is calculated using the two calculated image shift amounts. The CPU 150 calculates the detection axis direction to be controlled using the image shift amount calculated at Step S413 and the image shift amount calculated at Step S415. Thereafter, at Step S417, the control direction to be controlled is notified. The processing of Steps S416 and S417 will be described below with reference to FIGS. 12A and 12B.

Figure 12A:
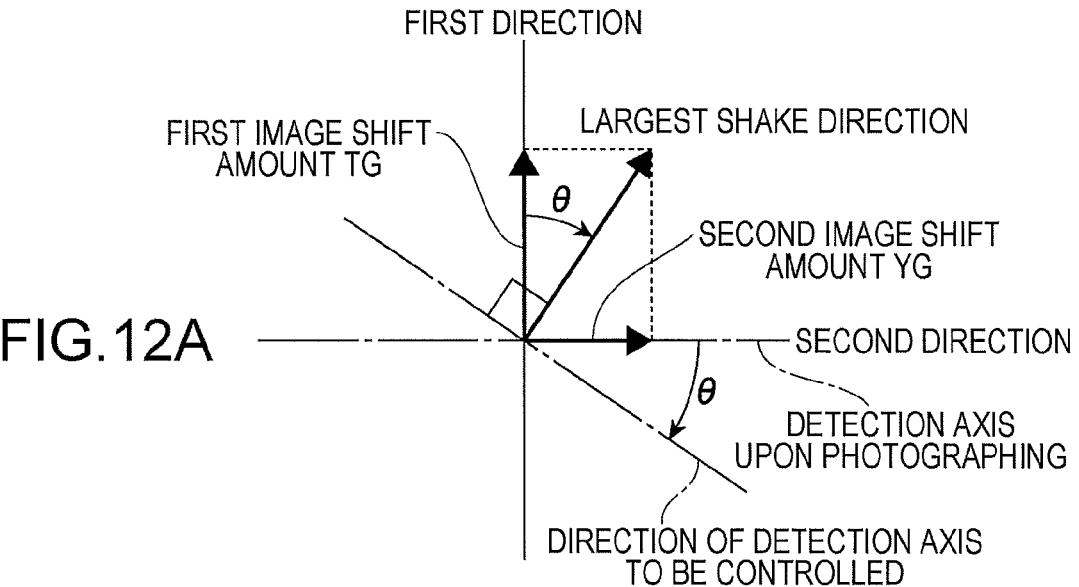
FIG. 12A is an explanatory view illustrating a processing of calculating a control direction of a detection axis.

FIG. 12A is an explanatory view illustrating the processing of Step S416. As shown in FIG. 12A, when an image shift amount in a first direction that is orthogonal to the detection axis is represented by TG and an image shift amount in a second direction that is a direction of the detection axis is represented by YG, the largest shake occurs in a direction where the image shift amounts TG and YG are subject to the vector composition. Therefore, the CPU 150 uses the image shift amounts TG and YG so as to calculate the detection axis direction to be controlled as a rotation angle θ by Equation 1.

$$\theta = \tan^{-1}(YG/TG) \qquad \text{Equation 1}$$

However, when the X-axis is the detection axis as shown in FIG. 1B, and the rotation direction of the pitch is different from the detection axis direction (the forward direction in FIG. 1B), the image of the subject is differently shifted in the up and down direction. Therefore, in this modification, in a rotation angle calculation processing, the image shift amount is calculated in a state where the upward and right directions are set to a positive direction in the photographed image. For example, if the image shift direction of the subject is the downward direction in FIG. 9A, the image shift amount in the first direction is calculated as '−TG'. Further, if the image shift direction of the subject is the left direction, the image shift amount in the second direction is calculated as '−YG'. As a result, the rotation angle to be calculated by Equation 1 also becomes a clockwise direction, if the value is positive.

Figure 12B:
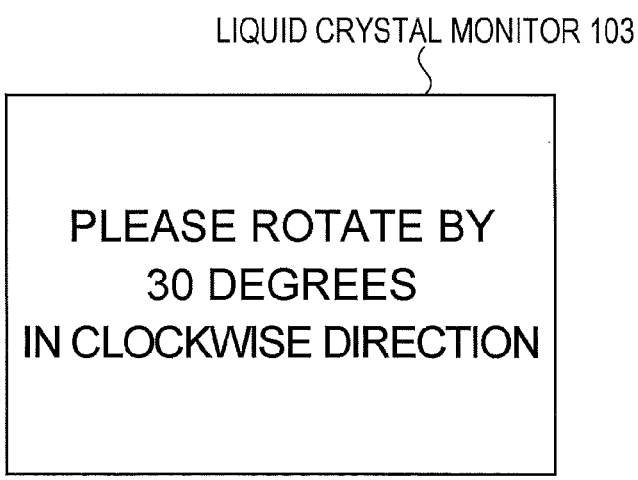
FIG. 12B is an explanatory view illustrating a notification example of a control direction.

FIG. 12B is an explanatory view illustrating an example of the processing of Step S417. As shown in FIG. 12B, the control direction to be controlled is notified on the liquid crystal monitor 103 provided at the back of the camera by a sentence. The CPU 150 reads out predetermined sentence data stored in the ROM 170, adds data regarding the rotation direction and rotation angle so as to create notification data, and displays the notification data on the liquid crystal monitor 103 through the driver 102. The notification is not limited to this sentence, but it may be a figure, such as an arrow that indicates a direction. Alternatively, a current detection axis direction before control and the detection axis direction to be controlled may be displayed in parallel. In addition, the detection axis direction that is being controlled and the detection axis direction to be controlled may be displayed in parallel. Then, it is easy for the photographer to visually check the detection axis direction to be controlled. Therefore, the control operation of the detection axis is easily performed.

Returning to FIG. 11, if the above-described processing to Step S417 ends, the process returns to Step S411, and it is judged whether it is the detection axis control mode or not. As described above, the CPU 150 judges whether or not the photographer has selected the mode using the mode selection button (not shown). When it is judged that it is the detection axis control mode, the above-described processing is repeated. For example, when there is a tendency in a direction where the shake is easily generated by the photographer, it can be expected that a direction where the largest shake of the camera occurs upon photographing is likely to be calculated by repeating the processing of the detection axis control mode several times.

Next, the photographing mode processing to be performed when the judgment result at Step S411 is NO will be described with reference to a flowchart shown in FIG. 13.

When the processing starts, it is judged at Step S421 whether or not the shutter is released. As described above, when receiving the shutter operation signal of the shutter button SB through the input I/F 140, the CPU 150 judges that the shutter is released. Next, when it is judged that the shutter is released upon receiving the shutter operation signal (Step S421: YES), the process proceeds to Step S423 such that Step S423 and later are performed. Meanwhile, when it is judged that the shutter is not released (Step S421: NO), the process returns to Step S421, and the processing of judging whether or not the shutter is released is repeated.

When the shutter is released, at Step s423, an image shift amount in a direction orthogonal to the detection axis is calculated. The CPU 150 acquires the detection axis direction from the detection axis direction acquiring unit 106 through the input I/F 140. Next, the CPU 150 calculates, as the number of pixels, an image shift amount in the direction orthogonal to the detection axis direction from digital data of rotation speed detected by the detection sensor 100 upon photographing, the field angle and shutter speed of the camera upon photographing, and the number of vertical and horizontal pixels of the imaging element.

Then, at Step S424, a shake amount is estimated using the image shift amount calculated in Step S423. In this modification, the CPU 150 estimates the shake amount as the number of pixels calculated as the image shift amount. Of course, a shake in an axial direction other than the detection axis may be assumed, and a table in which coefficients are set so as to correct the assumed shake amount may be stored in the ROM 170. Then, a value that is obtained by multiplying the calculated number of pixels by the coefficient may be calculated as an estimated shake amount.

Next, at Step S425, a photographing condition is corrected. Based on the estimated shake amount, the CPU 150 corrects the photographing condition, such as a shutter speed or sensitivity, upon actual photographing. For example, the number of pixels when one can recognize that the image of the subject is shifted in the photographed image is set to the reference number of pixels, and a ratio of the number of pixels estimated as the shake amount to the reference number of pixels is calculated. Then, correction is performed such that the shutter speed for a time corresponding to the ratio is increased. Further, since the exposure becomes insufficient as the shutter speed is increased, sensitivity is corrected so as to compensate for the insufficient exposure.

Further, at Step S426, the corrected photographing condition is output to the photographing circuit. The CPU 150 outputs the photographing condition corrected at Step S425 to the photographing circuit 190 in the camera through the output I/F 180.

Thereafter, at Step S427, it is judged whether or not the photographing mode is continued. If the photographing mode is continued (Step S427: YES), the process returns to Step S421 such that next photographing is prepared. Meanwhile, when the photographing mode is not continued, the photographing mode processing ends. Then, the process returns to the processing flow of FIG. 11, and the processing of the shake detection device ends. In this modification, the CPU 150 judges whether or not power of the camera is turned off or whether or not the photographer has selected a mode other than the photographing mode using the mode selection button (not shown), as described above. Then, it is judged whether or not the photographing mode is continued.

According to this modification, the detection axis can be controlled in a direction orthogonal to the direction where the largest shake is supposed to occur. Therefore, it can be expected that a shake amount to be estimated based on the shake amount estimated by one detection sensor approaches a shake amount to be actually generated. Accordingly, there is a high possibility that the photographing condition can be corrected so as to accurately suppress the image shift amount of the subject. In addition, since one detection sensor is used, it is possible to provide a shake detection device that suppresses reduction of lifespan of the battery.

The above-described first modification can be further modified into the following modifications A to F. The modifications A to F will be sequentially described.

Modification A

Figure 11:
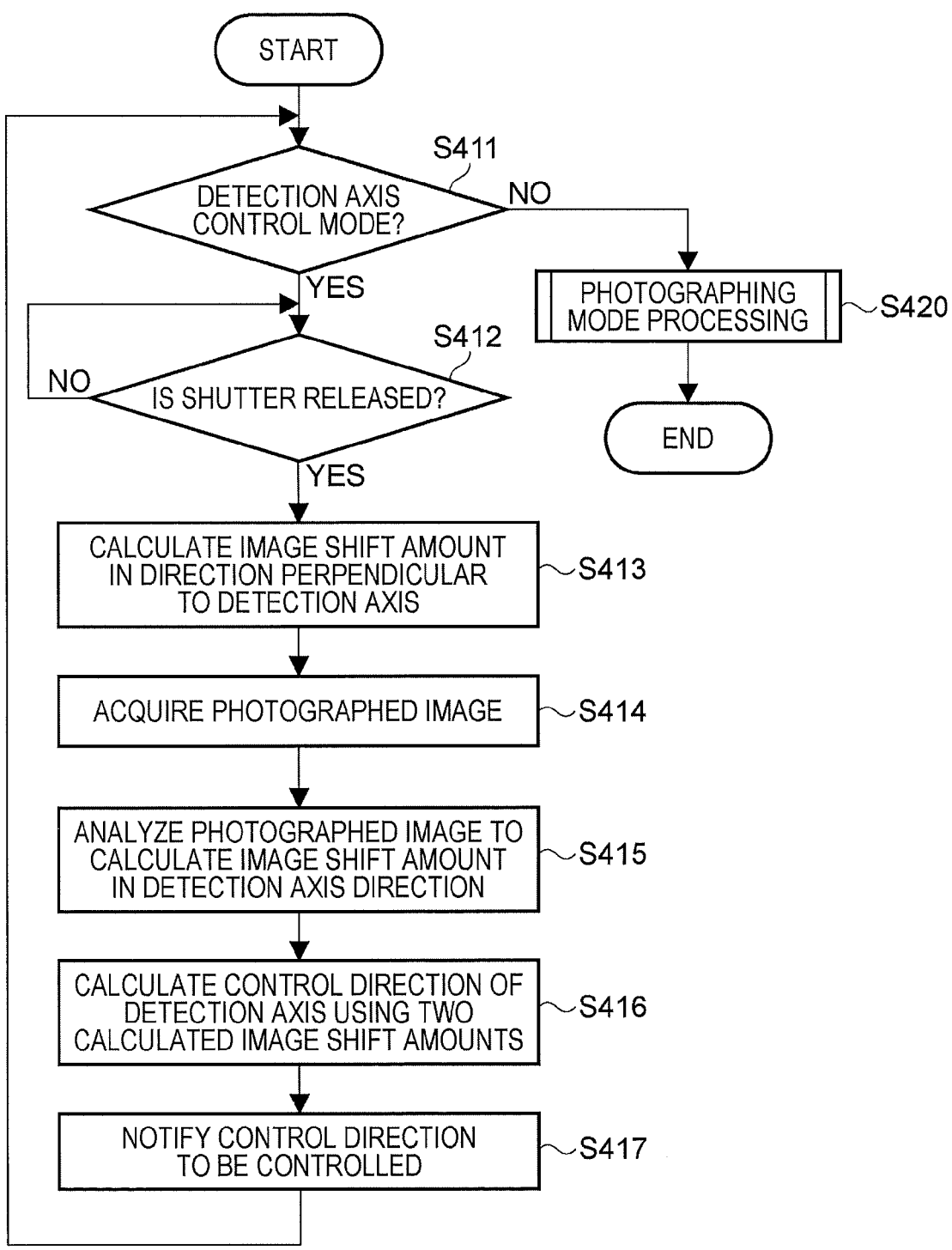
FIG. 11 is a flowchart illustrating a processing that is performed by the shake detection device according to the first modification.

In the first modification, the two image shift amounts are calculated, and the control direction of the detection axis is calculated using the calculated image shift amounts, as shown in FIG. 11. However, the magnitude of the rotation speed may be notified without calculating the image shift amounts. Accordingly, it is possible to reduce a processing load due to the calculation of the image shift amount. Of course, in this processing, the CPU 150 does not function as the first image shift amount calculation unit 200b, the second image shift amount calculation unit 200c, and the control direction calculation unit 400a, all of which are shown in FIG. 10.

Figure 14:
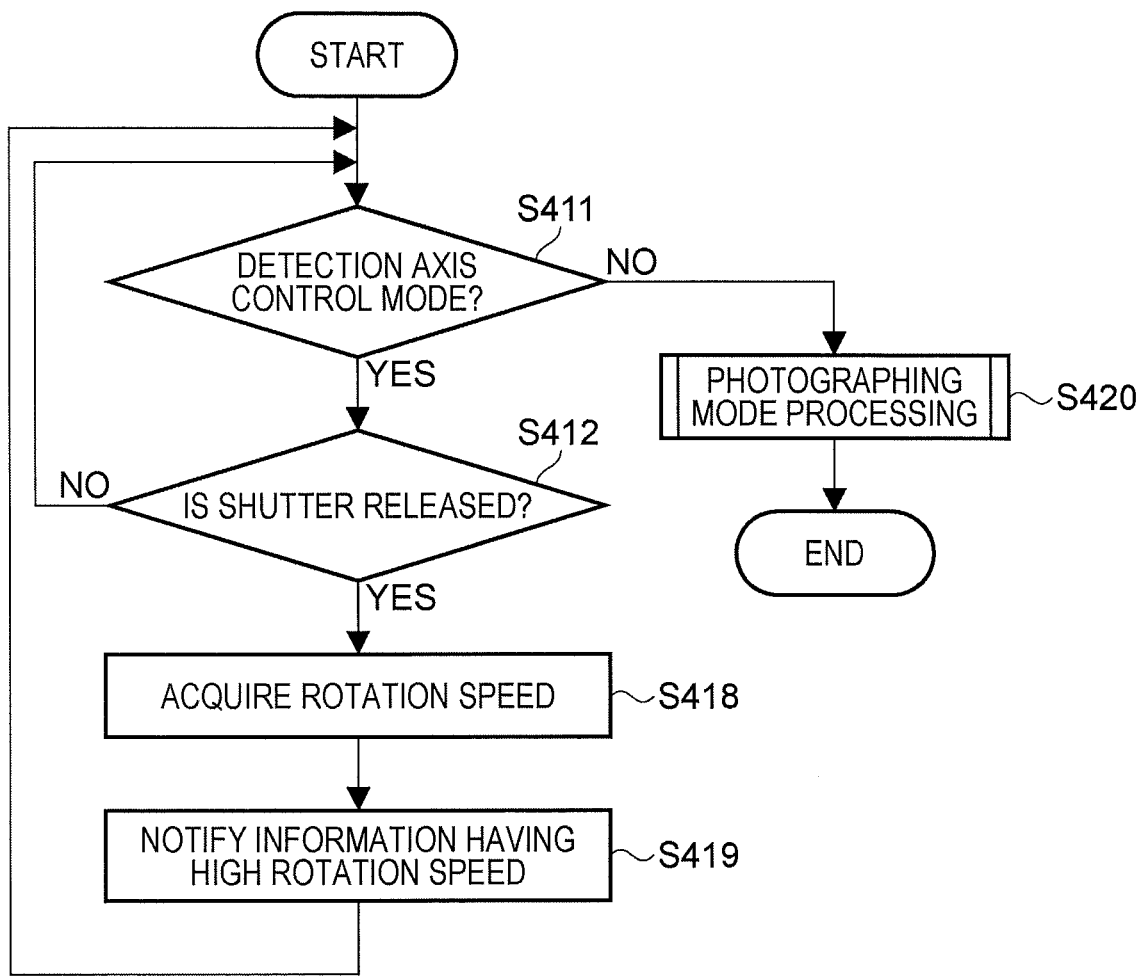
FIG. 14 is a flowchart illustrating a processing as a further modification of the first modification.

The modification A will be described with reference to a processing flowchart shown in FIG. 14. In the flowchart shown in FIG. 14, the processing of Steps S411, S412, and S420 is the same as that in the first embodiment, and thus a description thereof will be omitted. The processing of Steps S418 and S419 will be described.

At Step S418, the rotation speed of the detection sensor is acquired after it is judged that the shutter is released (Step S412: YES). When the shutter is released, the CPU 150 acquires the rotation speed as digital data from the detection sensor 100 through the A/D converter 101.

Then, at Step S419, magnitude information of the acquired rotation speed is notified. Thereafter, the process returns to Step S411, and it is judged whether or not it is the detection axis control mode. As described above, the CPU 150 judges whether or not the photographer has selected a mode using the mode selection button (not shown). When it is judged that it is the detection axis control mode, the above-described processing is repeated.

Figure 15A:
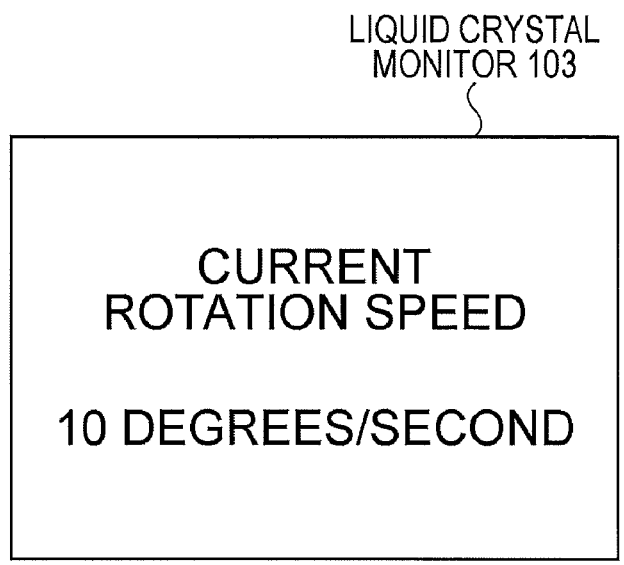
FIGS. 15A and 15B are diagrams illustrating a notification example of a rotation speed that is performed by a shake detection device according to a further modification of the first modification.
Figure 15B:
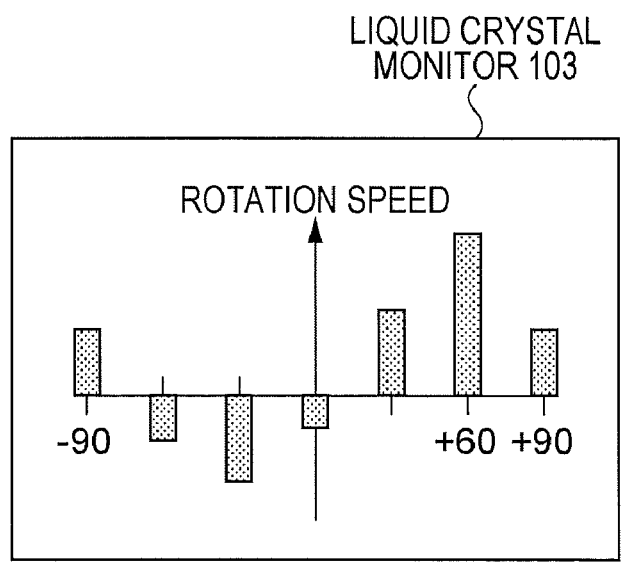

The processing contents at Step S419 will be described with reference to FIGS. 15A and 15B. FIG. 15A is an explanatory view illustrating an example of the processing at Step S419. As shown in FIG. 15A, the magnitude information of the rotation speed is notified on the liquid crystal monitor 103 at the back surface of the camera through a sentence. The CPU 150 reads out predetermined sentence data stored in the ROM 170, adds magnitude data of the rotation speed so as to create notification data, and displays the notification data on the liquid crystal monitor 103 through the driver 102. The notification is not limited to this sentence, but it may be a figure, such as a level meter that indicates the magnitude. Further, in this processing, the CPU 150 may acquire the detection axis direction from the detection axis direction acquiring unit 106 such that a processing load is reduced.

Alternatively, as Step S419, the CPU 150 acquires the detection axis direction from the detection axis acquiring unit 106 through the input I/F 140. Then, the CPU 150 may notify the magnitude information of the rotation speed with the acquired detection axis direction. This notification example is shown in FIG. 15B. As shown in FIG. 15B, an angle indicating the detection axis direction based on the camera is displayed on the horizontal axis of the liquid crystal monitor 103, and the magnitude of the rotation speed is displayed on the vertical axis on the liquid crystal monitor 103. When the angle and magnitude of the rotation speed are displayed, the photographer can easily check in which direction the largest shake occurs upon photographing. Therefore, the detection axis direction can be easily controlled to a direction where the largest shake can be detected.

Modification B

In the first modification, at Step S414 of FIG. 11, an image that is photographed in a state where the shake correction is not performed is acquired as a photographed image, and the image is analyzed so as to calculate the image shift amount in the detection axis direction. However, a photographed image after shake correction may be acquired, and the corrected photographed image may be analyzed.

Figure 13:
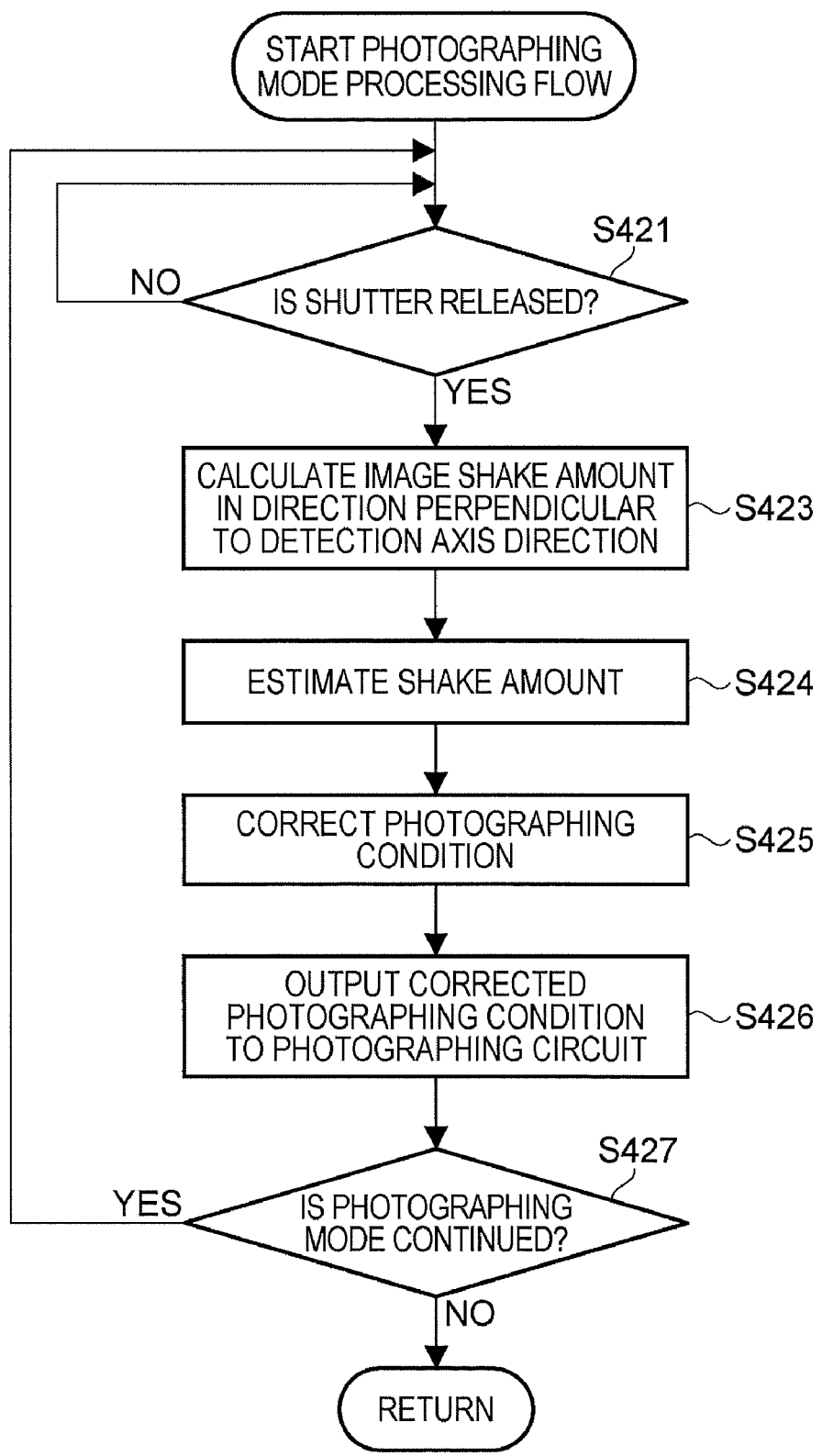
FIG. 13 is a flowchart of a photographing mode processing that is performed by the shake detection device according to the first modification.

In this case, between Steps S413 and S414 in FIG. 11, the processing from Step S424 to Step S426 shown in FIG. 13 is performed. Further, in the processing that is performed at Step S424, a shake amount in the detection axis direction may be set as a default value, and the default value and the image shift amount calculated at Step S423 may be used so as to estimate a shake amount. Then, a shake amount with respect to the detection axis direction can be assumed and then corrected. Further, in case of an image of the subject photographed in the detection axis control mode, a photographed image in which a shake is suppressed can be acquired using the corrected photographed image. Then, the acquired image can be used as a photographed image.

Further, the corrected photographed image is an image in which an image shift amount in the detection axis direction is suppressed, because the image is photographed under the photographing condition corrected based on the estimated shake amount. Therefore, as for the image shift amount calculated by performing the image analysis on the photographed image, a shift amount that is smaller than an image shift amount of the subject to be generated by an actual shake upon photographing is calculated. Therefore, when the processing at Step S415 is performed, the correction amount may be reversely corrected so as to calculate an image shift amount. Then, the image shift amount can approach a shake amount to be actually generated.

Modification C

In the first modification, a state where the first direction becomes an oblique direction based on the camera is also included and then an image shift amount is calculated. However, the first direction may be set to one of the vertical and horizontal directions based on the camera.

Depending on the shape of the camera or the photographer, it is also assumed that a large shake occurs in one of the vertical and horizontal directions. In this case, a rotation speed in one direction where the large shake occurs may be detected. Accordingly, the detection axis direction acquiring unit 106 may obtain two states where the detection axis is vertical and horizontal. Further, the detection axis direction control unit 105 may be also configured to perform control in two states where the detection axis is vertical and horizontal. Therefore, it is possible to simplify the configuration of the detection axis direction acquiring unit 106 and the detection axis direction control unit 105.

Further, since the calculation of the image shift amount is performed in one of the vertical and horizontal directions, a processing load upon calculation can be reduced. In addition, in the calculation of the direction to be controlled, two image shift amounts may be compared so that the direction of a larger one is set to a control direction. Therefore, a load due to this processing can be also reduced.

Modification D

In the first embodiment, the liquid crystal monitor 103 is set as a notification unit, and a sentence or a figure is displayed thereon. However, the notification may be performed using another method. For example, a sound body may be provided in the camera, such that the notification is performed through sound or voice. Alternatively, a light emitting body may be provided in the camera, such that the notification is performed using light. Then, even a camera that is not provided with the display body can control the detection axis.

Modification E

In the first embodiment, the two image shift directions of the first and second directions are set to cross each other at right angles. However, the two image shift directions may be set so as not to cross each other at right angles. For example, because of the structure of the camera, such as a mobile phone having a camera function, it can be assumed that the movement of the camera is significantly biased in a specific direction. In this case, the significant movement direction to be assumed may be calculated as an image shift direction. Then, the significant movement direction of the camera becomes identical to the detection direction of the detection sensor, so that a probability of estimating an appropriate shake amount is increased.

Modification F

In the first modification, the shakes in the two image shift directions of the vertical and horizontal directions, that is, the shakes in the directions accompanied by the rotations around the X and Y axes in FIG. 1 are detected, as described in FIG. 9. However, the directions of the shakes may be set to the directions accompanied by the X- and Z-axis rotations in FIG. 1, such that the shakes are detected. Alternatively, the shakes in the directions accompanied by the Y- and Z-axis rotations may be detected. In the first modification, it is assumed that the rotation around the Z axis rarely occurs. Therefore, the shakes around the X and Y axes are reviewed. However, depending on the photographing method of the photographer or the structure of the camera, it is also assumed that the rotation around the Z axis easily occurs. In this case, the rotation around the Z axis is detected, so that a shake amount can be more accurately estimated.

Second Modification

In the second embodiment, one detection sensor of the two detection sensors is driven, such that reduction of lifespan of the battery can be suppressed. However, in order to detect a shake amount to be generated upon photographing, one detection sensor should be driven for each photographing. Therefore, power for driving one detection sensor is needed (similarly to the first embodiment), and thus eliminating of power supply may be impossible. Accordingly, as a second modification, a photographing condition corrected according to a detected shake amount may be notified (indicated). The photographer sets a photographing condition, such as a shutter speed or an aperture, to the notified corrected photographing condition in subsequent photographing. Then, an image shift amount of the subject to be generated in the photographed image can be suppressed. Accordingly, in subsequent photographing, a shake amount does not need to be detected using the detection sensor, which means that the detection sensor does not need to be driven. Therefore, it is possible to extend the lifespan of the battery.

Figure 16:
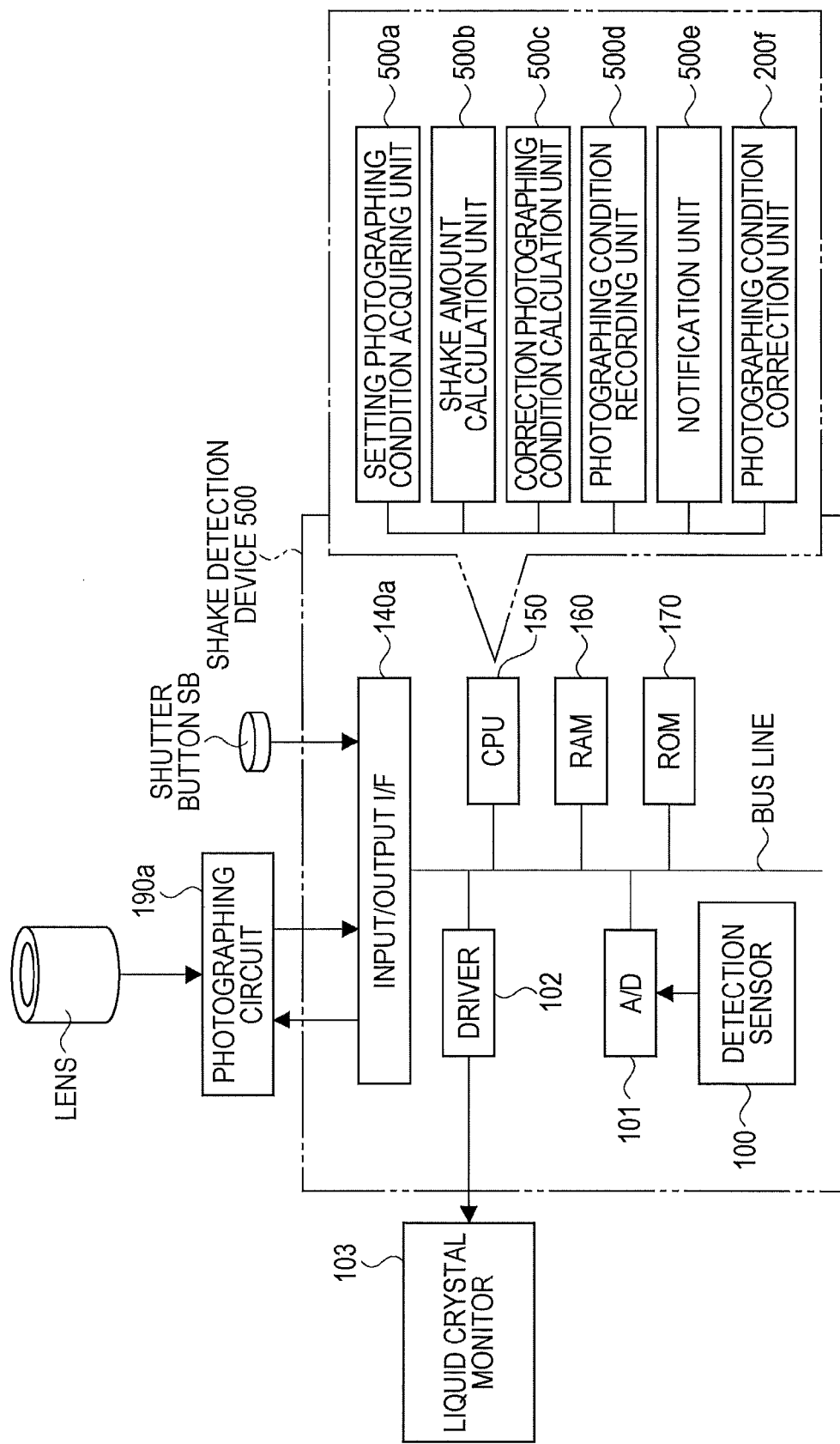
FIG. 16 is a diagram illustrating the functional configuration of a shake detection device according to a second modification.

Now, this modification will be described with reference to FIGS. 16 to 19. FIG. 16 is a block diagram illustrating the functional configuration of a shake detection device 500 of this modification that is incorporated into a camera. As shown in FIG. 16, the shake detection device 500 includes a CPU 150, a RAM 160, a ROM 170, an input/output interface (I/F) 140a, a detection sensor 100, an analog-to-digital converter 101, and a driver 102, all of which are connected to each other through a bus. In this modification, the same parts as those in the first modification are represented by the same reference numerals (see FIG. 10), and thus a description thereof will be omitted. Moreover, the detection sensor 100 is also driven by a driving circuit (not shown), similarly to the first modification.

The input/output I/F 140a functions as an input/output interface that transmits and receives predetermined data to and from a photographing circuit 190a in the camera, and as an input interface for a shutter operation of a shutter button SB. Under the photographing condition of the camera that is output from the input/output I/F 140a and then set, the photographing circuit 190a serves to take an image of the subject into an imaging element (not shown) of the camera. Further, in this modification, the photographing circuit 190a is set to have data relative to at least the number of vertical and horizontal pixels of the imaging element, the shutter speed, and the aperture upon photographing.

The CPU 150 reads out a program stored in the ROM 170, if necessary, and executes the program under a predetermined operating system. Then, the CPU 150 functions as a setting photographing condition acquiring unit 500a, a shake amount calculation unit 500b, a correction photographing condition acquiring unit 500c, a photographing condition recording unit 500d, a notification unit 500e, and a photographing condition correction unit 200f, all of which are shown on the right side of FIG. 16.

The respective units perform the following processing. The setting photographing condition acquiring unit 500a acquires a setting photographing condition, which is set in the camera, from the photographing circuit 190a. The shake amount calculation unit 500b calculates a shake amount of the camera using the rotation speed detected by the detection sensor 100. The correction photographing condition calculation unit 500c calculates a photographing condition to be corrected according to a shake amount upon photographing, that is, a photographing condition when an image of the subject is actually taken into the imaging element. The photographing condition recording unit 500d records the calculated photographing condition to be corrected. The notification unit 500e notifies the calculated photographing condition to be corrected. The photographing condition correction unit 200f corrects the setting photographing condition, which is set in the camera, to the calculated photographing condition to be corrected, as described above.

Now, the processing of the shake detection device 500 of this modification having the above-described functional blocks will be described with reference to a flowchart shown in FIG. 17.

When the processing starts, it is judged at Step S511 whether or not the camera is in a trial photographing mode. In this modification, the CPU 150 judges whether or not a photographer has selected a mode using the mode selection button (not shown). Of course, when first photographing is performed after power is turned on, the trial photographing mode may be set as a default. Further, for a predetermined number of photographing times, the trial photographing mode may be set as a default mode.

Next, when it is judged that the camera is in the trial photographing mode (Step S511: YES), the CPU 150 judges whether or not the shutter is released (Step S512). Meanwhile, when it is not judged that the camera is in the trial photographing mode (Step S511: NO), the process proceeds to Step S520, such that the photographing mode processing is executed. The photographing mode processing will be described below with reference to FIG. 18.

Next, at Step S512, the CPU 150 receives a shutter operation signal of the shutter button SB through the input/output I/F 140a. When it is judged that the shutter is released (Step S512: YES), the process proceeds to Step S513, such that Step S513 and later are performed. Meanwhile, when it is judged that the shutter is not released (Step S512: NO), the process returns to Step S512, and the processing of Step S512 is repeated.

When it is judged that the shutter is released (Step S512: YES), a setting photographing condition is acquired (Step S513). The CPU 150 acquires the set photographing condition from the photographing circuit 190a through the input/output I/F 140a. For example, in some cases, a camera has a plurality of prescribed photographing conditions according to the types of subjects, such as a night view and a flower, to be photographed. In this case, the photographer selects a type of subject to be desired using a selection unit (not shown) such that a photographing condition is set in the photographing circuit 190a. Then, the photographing condition set in such a manner is acquired from the photographing circuit 190a. Alternatively, when a photographing condition, such as a shutter speed or an aperture, which is requested by the photographer, is set by a setting unit (not shown), the set photographing condition is acquired from the photographing circuit 190a. Further, when the camera automatically sets a photographing condition, the automatically set photographing condition is acquired.

Next, at Step S514, a shake amount on photographing is detected. The CPU 150 acquires data regarding the rotation speed detected by the detection sensor 100 from the A/D converter 101. Further, the CPU 150 acquires, from the photographing circuit 190a, the field angle and shutter speed of the camera upon photographing and the number of vertical and horizontal pixels of the imaging element. Then, the CPU 150 calculates a shake amount upon photographing as the number of pixels.

Next, at Step S515, a correction photographing condition is calculated. Based on the calculated shake amount, the CPU 150 corrects the shutter speed and the aperture among the set photographing conditions when an image of the subject is actually taken by the imaging element. For example, the number of pixels when one can recognize that the image of the subject is shifted in the photographed image is set to the reference number of pixels, and a ratio of the number of pixels calculated as the shake amount to the reference number of pixels is calculated. Then, correction is performed such that the shutter speed for a time corresponding to the ratio is increased. Further, since the exposure becomes insufficient as the shutter speed is increased, the aperture is corrected so as to compensate for the insufficient exposure.

In this modification, the reference number of pixels is previously stored in the ROM 170. When calculating a correction photographing condition, the CPU 150 reads out the value from the ROM 170 and then uses the read value. In addition, the photographer may input the desired number of pixels using an input unit (not shown), and the input number of pixels may be stored in the RAM 160 as the reference number of pixels. Then, the CPU 150 reads out the number of pixels from the RAM 160 and then uses the read number of pixels.

In this modification, as for the shutter speed and the aperture among the photographing conditions, a value set by the photographer upon photographing or a value that is automatically set by the camera is corrected based on the calculated shake amount. The photographing condition may include sensitivity or flash lighting, an image processing condition, such as edge enhancement, and multi-shot photographing, all of which are to be corrected, if necessary.

Next, at Step S516, the setting photographing condition, the shake amount, and the correction photographing condition are recorded. At this time, the CPU 150 stores data into a predetermined recording area in the RAM 160.

Thereafter, the process returns to Step S511, and the processing subsequent to the judgment of whether or not the camera is in the trial photographing mode is repeated. As described above, the CPU 150 judges whether or not the photographer has selected a mode using the mode selection button (not shown). When the camera is in the trial photographing mode, a setting photographing condition, a correction photographing condition obtained by correcting the setting photographing condition, and a shake amount are recorded for each photographing. Of course, when a predetermined number of photographing times are set to the trial photographing mode as a default, a predetermined number of processing are repeated. As a result, the setting photographing condition, the correction photographing condition obtained by correcting the setting photographing condition, and the shake amount are recorded in the RAM 160 the predetermined number of times.

Next, the photographing mode processing that is performed when it is not judged that the camera is in the trial photographing mode (Step S511: NO) will be described with reference to a flowchart shown in FIG. 18.

When the processing starts, first, at Step S523, a setting photographing condition is acquired. The CPU 150 acquires the set photographing condition from the photographing circuit 190*a* through the input/output I/F 140*a*. This processing is performed in the same manner as the processing at Step S513 of FIG. 17, and thus the description thereof will be omitted.

Next, at Step S524, a corresponding correction photographing condition is searched. The CPU 150 verifies the setting photographing condition recorded in the RAM 160 and the setting photographing condition acquired at Step S523. Then, a correction photographing condition acquired by correcting the setting photographing condition, which is the verification result, is read out as the corresponding correction photographing condition.

Figure 19A:
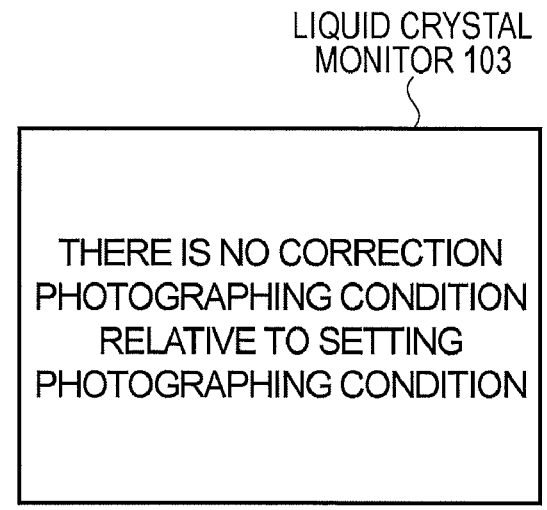
FIG. 19A is a display example when a correction photographing condition does not exist.

Next, at Step S525, it is judged whether or not the correction photographing condition exists. When it is judged that the correction photographing condition does not exist (Step S525: NO), that is, when a corresponding correction photographing condition is not read out, it is notified that the correction photographing condition does not exist (Step S526). The CPU 150 reads out a predetermined sentence stored in the ROM 170 and displays the sentence on the liquid crystal monitor 103 through the driver 102 for notification. A display example is shown in FIG. 19A. Then, when checking the displayed sentence, the photographer recognizes that a correction photographing condition corresponding to the desired setting photographing condition is not calculated. Accordingly, the photographer sets a photographing condition of the camera to the desired setting photographing condition and performs photographing at the trial photographing mode. Then, the photographer can acquire a correction photographing condition corresponding to the desired setting photographing condition.

Meanwhile, when a correction photographing condition exists (Step S525: YES), that is, when a corresponding correction photographing condition is read out, at Step S527, it is judged whether or not the photographing condition is set to the correction photographing condition. The CPU 150 displays on the liquid crystal monitor 103 a selection screen on which the photographer can select whether to set the photographing condition to the correction photographing condition. With the screen, the photographer selects whether to set the photographing condition to the correction photographing condition using an input unit (not shown).

Figure 19B:
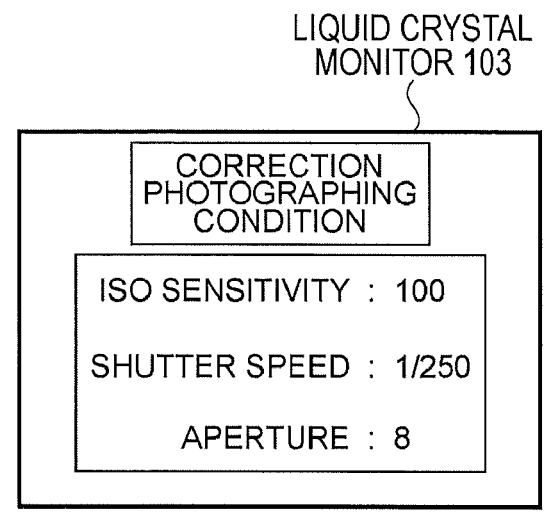
FIG. 19B is a display example of a correction photographing condition.

When the setting is not selected (Step S527: NO), the correction photographing condition is notified at Step S528. The CPU 150 displays the correction photographing condition, read from the RAM 160, on the liquid crystal monitor 103. A display example is shown in FIG. 19B. Then, when seeing the display, the photographer can check a correction photographing condition corresponding to the desired setting photographing condition. Further, the photographer can set a photographing condition to the correction photographing condition, if necessary, and can set a photographing condition to another correction photographing condition by referring to the displayed correction photographing condition.

Figure 19C:
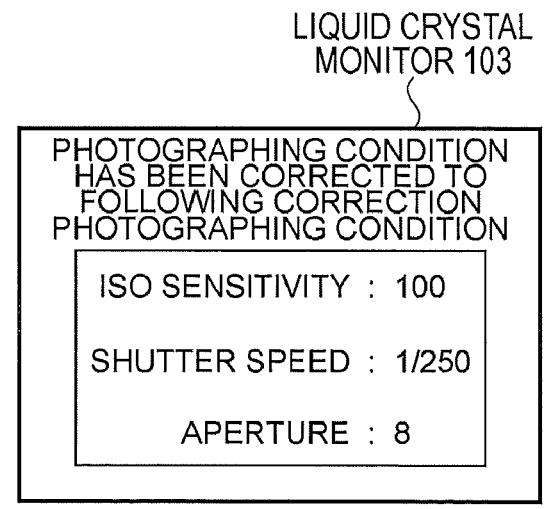
FIG. 19C is a display example when a photographing condition is changed to a correction photographing condition.

Meanwhile, when the setting to the correction photographing condition is selected (Step S527: YES), at Step S529, the photographing condition is changed to the correction photographing condition. The CPU 150 outputs the correction photographing condition, read from the RAM 160, to the photographing circuit 190*a* through the input/output I/F 140*a* and then corrects the setting photographing condition set in the camera to the correction photographing condition. At this time, the CPU 150 may read out a predetermined sentence stored in the ROM 170 and display the sentence on the liquid crystal monitor 103 through the driver 102, thereby notifying the change processing. A display example is shown in FIG. 19C. Then, when seeing the display, the photographer can check that the photographing condition is changed to the correction photographing condition.

Figure 17:
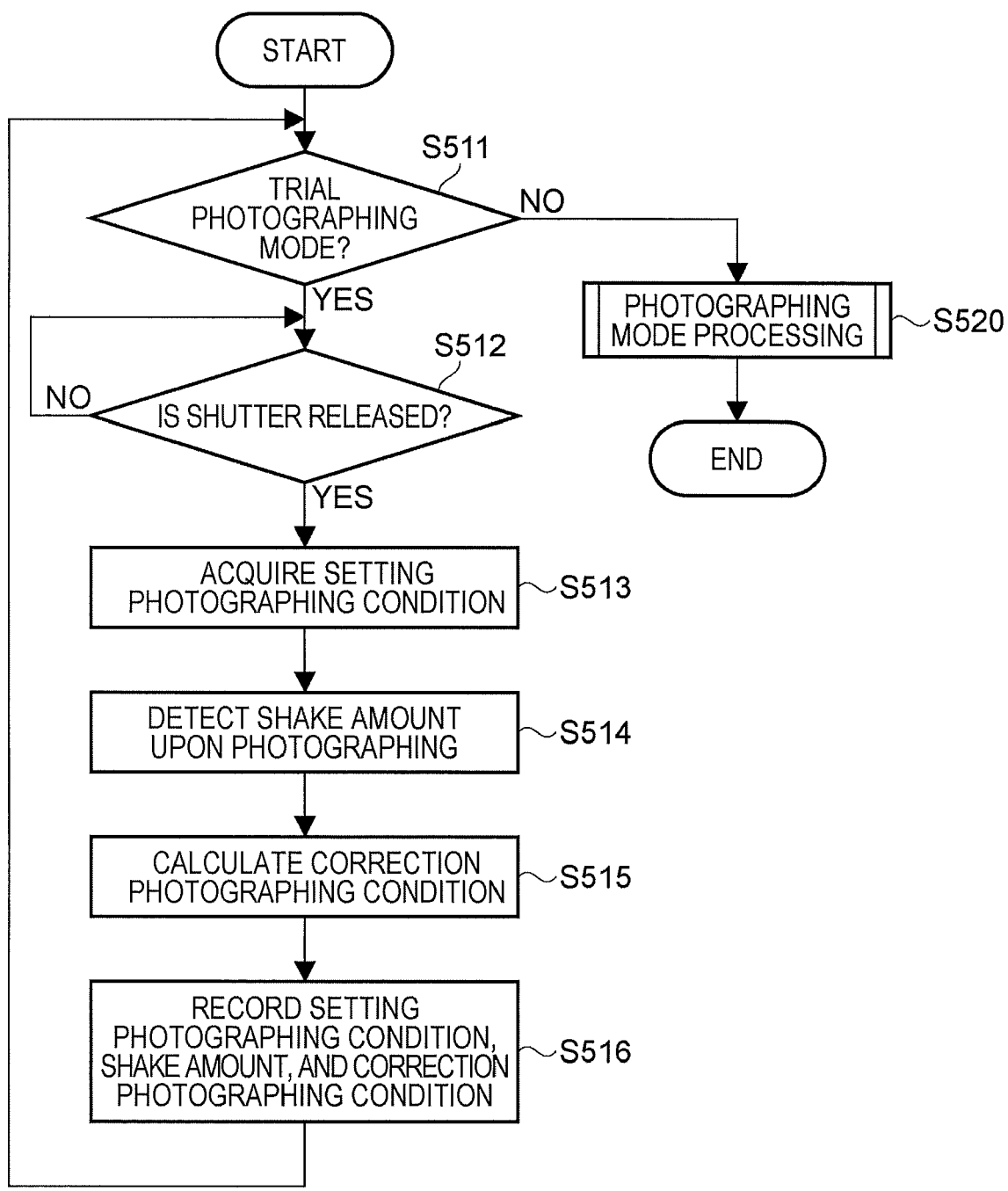
FIG. 17 is a flowchart illustrating a processing that is performed by the shake detection device according to the second modification.
Figure 18:
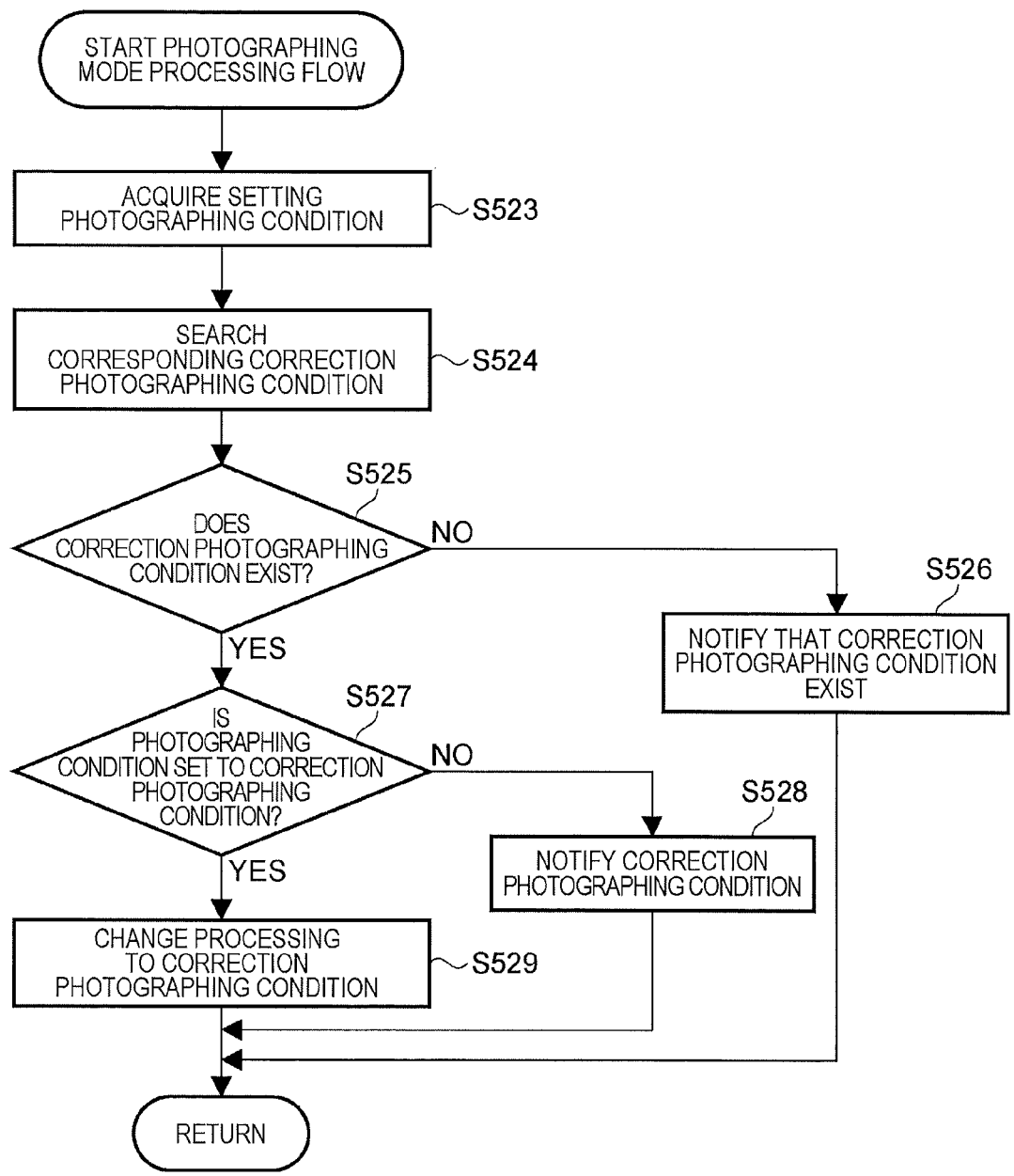
FIG. 18 is a flowchart of a photographing mode processing that is performed by the shake detection device according to the second modification.

As such, if the processing flow at the photographing mode ends, the process returns to the processing flow of FIG. 17. Then, the processing of the shake detection device in this modification ends. As the processing shown in FIGS. 17 and 18 is performed, an image of the subject is photographed under the correction photographing condition when subsequent photographing is performed after a photographing condition is set to the correction photographing condition. Therefore, the photographer can photograph an image in which an image shift of the subject is suppressed. Further, upon photographing after a photographing condition is set to the correction photographing condition, a shake amount does not need to be detected by the detection sensor 100. Therefore, the detection sensor 100 does not need to be driven, which makes it possible to extend the lifespan of the battery.

According to the second modification, a shake amount to be generated upon photographing is calculated using the detection sensor. According to the calculated shake amount, a setting photographing condition to be set upon photographing is corrected, and the corrected photographing condition is displayed on the liquid crystal monitor. Therefore, a photographer sets a photographing condition, such as a shutter speed or an aperture, to the displayed correction photographing condition upon subsequent photographing, such that an image shift amount of the subject to be generated in a photographed image can be suppressed. Further, a shake amount does not need to be detected using the detection sensor upon subsequent photographing. Therefore, the detection sensor does not need to be driven, which makes it possible to extend the lifespan of the battery.

The second modification can be further modified into modifications G to K. The modifications G to K will be sequentially described.

Modification G

In the second modification, only the correction photographing condition is displayed on the liquid crystal monitor 103 at Step S528 of FIG. 18. However, both the correction photographing condition and the setting photographing condition may be displayed on the liquid crystal monitor 103 for notification. Alternatively, the setting photographing condition and the shake amount may be displayed on the liquid crystal monitor 103, together with the correction photographing condition for notification. Further, the setting photographing condition, the shake amount, and the reference number of pixels may be displayed on the liquid crystal monitor 103, together with the correction photographing condition.

Figure 20:
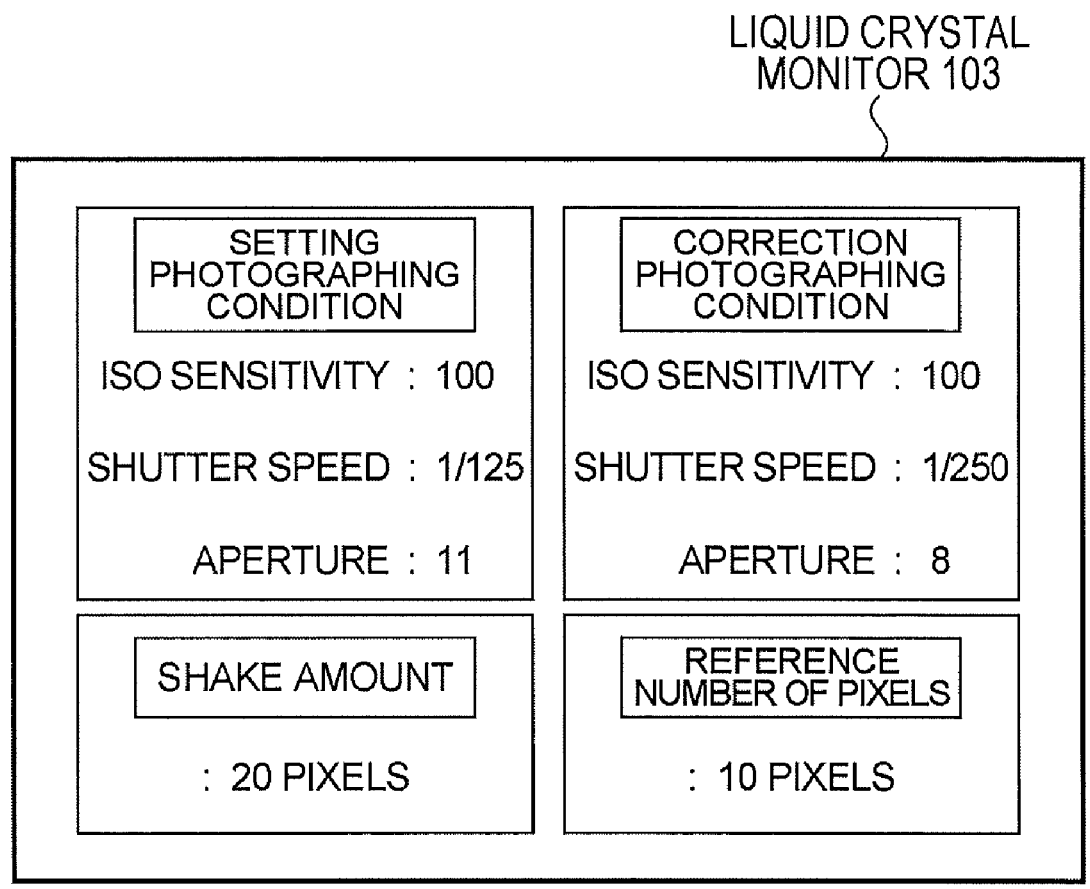
FIG. 20 is a diagram illustrating a display example on a liquid crystal monitor in a further modification of the second modification.

FIG. 20 is an explanatory view illustrating a display example on the liquid crystal monitor 103. The setting photographing condition and the shake amount are displayed on the left side of the liquid crystal monitor 103, and the correction photographing condition and the reference number of pixels are displayed on the right side thereof. As shown in FIG. 12, the shutter speed is corrected from $1/125$ second to $1/250$ second, such that the shutter speed is increased. Further, the aperture is corrected from 11 to 8, which means that the aperture is opened wider. Further, the shake amount upon photographing is displayed as 20 pixels when photographing is performed under the setting photographing condition, and the reference number of pixels is 10. As the setting photographing condition and the correction photographing condition are displayed together on the liquid crystal monitor 103, and if the setting photographing condition is corrected in any manner, the photographer can compare the displayed photographing conditions so as to easily check whether or not an image of the subject can be photographed with a suppressed shake.

Modification H

In the second modification, it has been described that the plurality of setting photographing conditions exists in the trial photographing mode shown in FIG. 17, depending on the types of subjects. When a plurality of trial photographing are performed under the same setting photographing condition, a correction photographing condition upon subsequent photographing in the photographing mode may be calculated using the plurality of correction photographing conditions calculated in the plurality of trial photographing.

For example, when the photographer selects a 'flower' as the subject, the camera automatically sets an optimal photographing condition for photographing a 'flower' as a setting photographing condition in the photographing circuit 190a. For example, the subject 'flower' is photographed five times in the trial photographing mode. Then, a correction photographing condition caused by a shake occurring upon photographing is calculated five times and is then recorded in the RAM 160. With the correction photographing conditions five times recorded in the RAM 160, the CPU 150 calculates a correction photographing condition when the subject 'flower' is photographed after trial photographing.

Then, with respect to the setting photographing condition, the correction can be performed according to a variation in shake to be generated by the photographer. As a result, an image shift of the subject corresponding to the variation in shake can be suppressed. Further, in the method of calculating a correction photographing condition when photographing is performed after trial photographing, a correction photographing condition, the frequency of which is high, may be calculated. Alternatively, a correction photographing condition where the shutter speed is the highest may be calculated, or a correction photographing condition where the aperture is the largest may be calculated. Further, the calculation methods may be selected by the photographer. Further, among the photographing conditions that can be set in the camera, a photographing condition that is the closest to an average value of the plurality of correction photographing conditions may be calculated.

Modification I

In the second modification, the photographing condition and the like to be notified are displayed and notified on the liquid crystal monitor 103 in the camera. However, the photographing condition and the like may be notified using other methods. For example, when a sound body, such as a speaker, is provided in the camera, the photographing condition may be notified by sound or voice. Alternatively, when a light emitting body, such as an LED, is provided in the camera, the photographing condition may be notified by light. Then, the photographing condition can be also changed even in the camera that is not provided with a display body.

Modification J

In the second modification, the photographing condition is notified by the notification unit, such as the liquid crystal monitor 103 in the camera. However, when a photographed image is recorded as an image file, the photographing condition may be recorded as additional information of the photographed image in order to notify the photographing condition. Then, the photographer can check, from the additional information recorded in the image file, a correction photographing condition with respect to the setting photographing condition on photographing. Further, depending on a type of subject to be photographed, a photographing condition is set to the checked correction photographing condition. Then, the photographing condition can be set to an optimal photographing condition where an image shift amount of the subject is suppressed.

Modification K

In the second modification, the correction photographing condition is calculated in the set trial photographing mode. However, without the trial photographing mode, a correction photographing condition may be calculated upon typical photographing. That is, in typical photographing, the processing shown in FIG. 17 may be performed. Then, the photographer does not need to select the trial photographing mode, but he/she can acquire a correction photographing condition through typical photographing. In this case, in the processing at Step S511 of FIG. 17, it may be judged whether or not the photographing mode processing is performed, instead of judging whether or not it is the trial photographing mode. Further, when the photographing mode processing is performed (YES), the process may proceed to Step S520.

Third Modification

In the first embodiment, when a horizontal image shift amount is calculated, the image analysis is performed using the image to be actually photographed. However, the image analysis may be performed using a through image that is displayed on a monitor (not shown) in a camera at a predetermined interval, without using a photographed image.

As will be apparent from the description of the first embodiment, an image to be actually photographed is photographed under a photographing condition corrected based on an estimated shake amount. Therefore, in many cases, it is assumed that the photographed image becomes an image, the horizontal image shift amount of which is suppressed. In such a case, the horizontal image shift amount to be calculated by analyzing the photographed image is smaller than the image shift amount of the subject that is generated by an actual horizontal shake when photographing.

Meanwhile, a through image is an image of a subject to be taken by an imaging element under the previous photographing condition that is corrected based on an estimated shake amount. Therefore, it can be expected that an image shift amount in the through image approaches an image shift amount of a subject to be generated by an actual horizontal shake when photographing, rather than a horizontal image shift amount to be obtained by analyzing a photographed image. Accordingly, while a memory for storing a through image is needed, a shake amount to be estimated using a horizontal image shift amount obtained by analyzing a through image is likely to approach an actual shake amount. Preferably, a through image to be used for image analysis is an image that is taken latest.

Fourth Modification

In the second embodiment, the two detection sensors to be driven are set to the detection sensors that detect the rotation speed around the X axis and the rotation speed around the Y axis. However, two detection sensors may be respectively set as detection sensors that detect the rotation speed around the X axis and the rotation speed around the Z axis. Alternatively, two detection sensors may be respectively set as detection sensors that detect the rotation speed around the Y axis and the rotation speed around the Z axis.

In the above-described second embodiment, since it is assumed that the rotation around the Z axis rarely occurs, the two detection sensors are set to the X- and Y-axis detection sensors, respectively. However, it can be also assumed that the rotation around the Z axis easily occurs depending on a photographing method of a photographer or the structure of a camera. Accordingly, in such a case, the rotation speed around the Z axis is detected, such that an accurate shake amount can be estimated.

Fifth Modification

In the second embodiment, when photographing is performed a second time and later, an image shift amount calculated when first photographing is calculated as any one of vertical and horizontal image shift amounts. In this modification, when photographing is performed a second time and later, only an image shift amount to be calculated by one detection sensor to be driven may be used, without using a horizontal or vertical image shift amount calculated when first photographing.

Depending on a photographing method of a photographer, it is assumed that a larger shake occurs in the horizontal direction than in the vertical direction or a larger shake occurs in the vertical direction than in the horizontal direction. In such a case, an image shift amount when second photographing and later is calculated in only a direction where an image shift amount judged when first photographing is larger. Then, it can be expected that the shake amount estimated using the one-direction image shift amount also approaches an actual shake amount to be generated when photographing. Then, when photographing is performed a second time and later, only one image shift amount is processed, which makes it possible to reduce a processing load.

Sixth Modification

In the first and second embodiments, the two image shift directions, that is, the vertical and horizontal directions are set to cross each other at right angles. However, the invention is not limited thereto. For example, two image shift directions may be set so as not to cross each other at right angles. For example, because of the structure of the camera, the motion of the camera can be biased to a specific direction. Further, when two detection sensors are provided in the camera in the second embodiment, the detection sensors may be provided so as not to cross each other at right angles because of the structure of the camera. In such a case, the specific direction may be used as an image shift direction, and a direction according to the axial direction of the provided detection sensor may be used to calculate an image shift amount. Then, the movement direction of a camera becomes the same as the detection direction of the detection sensor, such that an appropriate shake amount can be estimated with high accuracy.

Seventh Modification

In the first and second embodiments, it has been described that the shake detection device is incorporated into the digital camera. However, the shake detection device can be incorporated into an electronic apparatus having a photographing function, such as a cellular phone or a binocular having a camera function, in addition to the camera. The shake detection device according to the invention can be applied to such an electronic apparatus.

What is claimed is:

1. A shake detection device that detects a shake amount of a camera to be generated when photographing a subject, the shake detection device comprising:
   a detection sensor that detects a rotation speed around a predetermined axis of the camera;
   a first image shift amount calculation unit that drives the detection sensor to detect the rotation speed and, for an image of the subject to be photographed by the camera, calculates a first image shift amount as an image shift amount in a first direction on the basis of the rotation speed;
   a second image shift amount calculation unit that performs a predetermined image analysis on the image of the subject photographed by the camera and, for the image of the subject photographed by the camera, calculates a second image shift amount as an image shift amount in a second direction on the basis of the analysis result;
   a shake amount estimation unit that estimates the shake amount of the camera using the first image shift amount and the second image shift amount; and
   an image shift amount recording unit that records the second image shift amount calculated by the second image shift amount calculation unit each time the subject is photographed,
   wherein the shake amount estimation unit estimates the shake amount of the camera using an image shift amount, which is calculated through a predetermined method from a plurality of second image shift amounts recorded by the image shift amount recording unit, as the second image shift amount.

2. The shake detection device according to claim 1, wherein the first direction and the second direction in the photographed image are set to cross each other at right angles.

3. The shake detection device according to claim 1, further comprising:

a photographing condition correction unit that corrects a photographing condition of the camera according to the shake amount estimated by the shake amount estimation unit.

4. The shake detection device according to claim 3, further comprising:
a notification unit that notifies the corrected photographing condition.

5. A shake detection method that detects a shake amount of a camera to be generated when photographing a subject, the shake detection method comprising:
driving a detection sensor for detecting a rotation speed around a predetermined axis of the camera to detect the rotation speed and, for an image of the subject to be photographed by the camera, calculating a first image shift amount as an image shift amount in a first direction on the basis of the rotation speed;
performing a predetermined image analysis on the image of the subject photographed by the camera and, for the image of the subject photographed by the camera, calculating a second image shift amount as an image shift amount in a second direction on the basis of the analysis result;
recording the second image shift amount each time the subject is photographed;
estimating a further image shift amount from a plurality of the recorded second image shift amounts using a predetermined method; and
estimating the shake amount of the camera using the first image shift amount and the further image shift amount.

6. A tangible computer readable medium storing a computer program executable on a processor, the computer program detecting a shake amount of a camera to be generated when photographing a subject, the computer program comprising:
driving a detection sensor for detecting a rotation speed around a predetermined axis of the camera to detect the rotation speed and, for an image of the subject to be photographed by the camera, calculating a first image shift amount as an image shift amount in a first direction on the basis of the rotation speed;
performing a predetermined image analysis on the image of the subject photographed by the camera and, for the image of the subject photographed by the camera, calculating a second image shift amount as an image shift amount in a second direction on the basis of the analysis result;
recording the second image shift amount each time the subject is photographed;
estimating a further image shift amount from a plurality of the recorded second image shift amounts using a predetermined method; and
estimating the shake amount of the camera using the first image shift amount and the further image shift amount.

* * * * *